(12) United States Patent
Hassan et al.

(10) Patent No.: US 11,862,396 B1
(45) Date of Patent: Jan. 2, 2024

(54) SINGLE JUNCTION SUPERCAPACITIVE SOLAR CELL FOR ENERGY HARVESTING AND ENERGY STORAGE AND METHOD OF PREPARATION THEREOF

(71) Applicants: KING FAHD UNIVERSITY OF PETROLEUM AND MINERALS, Dhahran (SA); King Abdullah City for Atomic & Renewable Energy (K.A.CARE), Riyadh (SA)

(72) Inventors: Muhammad Hassan, Dhahran (SA); Mohammad A. Gondal, Dhahran (SA); Mohamed Abdulkader Dastageer, Dhahran (SA); Talal Farhan Ahmed Qahtan, Dhahran (SA)

(73) Assignees: KING FAHD UNIVERSITY OF PETROLEUM AND MINERALS, Dhahran (SA); King Abdullah City for Atomic & Renewable Energy (K.A.CARE), Riyadh (SA)

( * ) Notice: Subject to any disclaimer, the term of this patent is extended or adjusted under 35 U.S.C. 154(b) by 0 days.

(21) Appl. No.: 17/862,891

(22) Filed: Jul. 12, 2022

(51) Int. Cl.
*H01G 11/62* (2013.01)
*H01G 11/84* (2013.01)
(Continued)

(52) U.S. Cl.
CPC ............. *H01G 11/62* (2013.01); *H01G 11/34* (2013.01); *H01G 11/52* (2013.01); *H01G 11/84* (2013.01)

(58) Field of Classification Search
None
See application file for complete search history.

(56) References Cited

U.S. PATENT DOCUMENTS

| | | | |
|---|---|---|---|
| 11,024,467 | B2 | 6/2021 | Luo et al. |
| 11,024,468 | B2 | 6/2021 | Luo et al. |

(Continued)

FOREIGN PATENT DOCUMENTS

| | | |
|---|---|---|
| CN | 102810406 B | 9/2015 |
| CN | 103578798 B | 1/2017 |

(Continued)

OTHER PUBLICATIONS

Muhamed Shareef Kolathodi, et al., "Development of high-performance flexible solid state supercapacitor based on activated carbon and electrospun $TiO_2$ nanofibers", Scripta Materialia, vol. 101, May 2015, pp. 84-86 (Abstract only).

(Continued)

*Primary Examiner* — Dion R. Ferguson
(74) *Attorney, Agent, or Firm* — Oblon, McClelland, Maier & Neustadt, L.L.P.

(57) ABSTRACT

A light harvesting supercapacitor and a method of preparing the light harvesting supercapacitor is disclosed. The light harvesting supercapacitor includes a transparent conducting substrate, an active layer including $TiO_2$ nanoparticles and polyaniline (PAM) nanoparticles disposed on the transparent conducting substrate, an electrolyte layer including a solid separator soaked with an electrolyte comprising polyvinyl alcohol and at least one ionic material selected from the group consisting of phosphoric acid, sulfuric acid, hydrochloric acid, hydrobromic acid, hydroiodic acid, an alkali metal phosphate salt, an alkali metal sulfate salt, an alkali metal hydroxide, an alkali metal halide, and a mixture of a halogen and an alkali metal halide disposed on the active layer, a carbon electrode disposed on the electrolyte layer, and a metal layer disposed on the activated carbon electrode. The light harvesting supercapacitor of the present disclosure can be used in a photovoltaic device.

20 Claims, 14 Drawing Sheets

(51) Int. Cl.
*H01G 11/52* (2013.01)
*H01G 11/34* (2013.01)

(56) References Cited

U.S. PATENT DOCUMENTS

| | | | | |
|---|---|---|---|---|
| 11,488,788 B2 * | 11/2022 | Zhi | ........................ | H01G 11/02 |
| 2018/0366280 A1 * | 12/2018 | Hwang | .................. | H01G 11/70 |
| 2019/0051936 A1 * | 2/2019 | Meshcheryakov | ..... | H01M 6/40 |

FOREIGN PATENT DOCUMENTS

| | | | | | |
|---|---|---|---|---|---|
| CN | 108531954 A | | 9/2018 | | |
| CN | 110676073 A | * | 1/2020 | ............. | H01G 11/56 |
| IN | 201611009250 A | | 9/2017 | | |

OTHER PUBLICATIONS

Hyun Seok Jang, et al., "Enhanced Supercapacitive Performances of Functionalized Activated Carbon in Novel Gel Polymer Electrolytes with Ionic Liquid redox-mediated Poly(vinyl alcohol)/ Phosphoric Acid", Australian Institute for Innovative Materials—Papers, RSC Advances, vol. 6, Issue 79, Aug. 3, 2016, pp. 75376-75383.

Hyuna Lim, et al., "A comparative study of the polyaniline thin films produced by the cluster beam deposition and laser ablation methods", AIP the Journal of Chemical Physics, vol. 124, Issue 1, Feb. 2006, 2 pages (Abstract only).

* cited by examiner

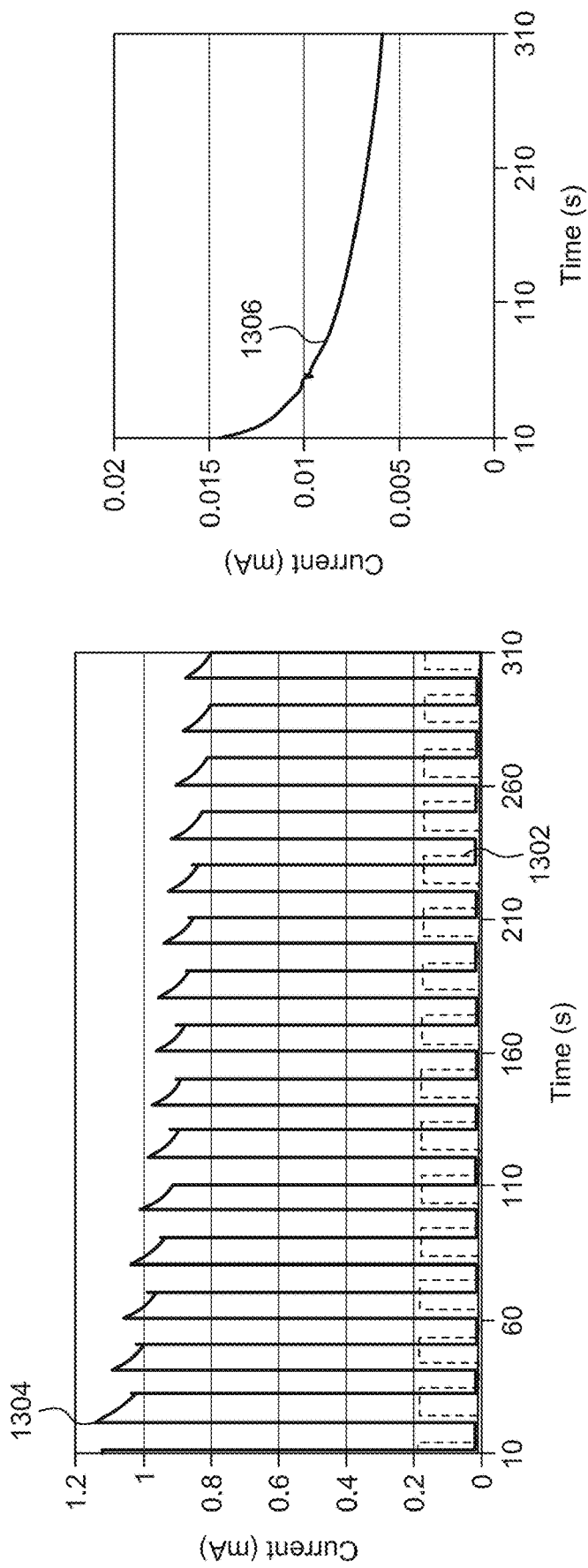

SINGLE JUNCTION SUPERCAPACITIVE SOLAR CELL FOR ENERGY HARVESTING AND ENERGY STORAGE AND METHOD OF PREPARATION THEREOF

BACKGROUND

Technical Field

The present disclosure is directed to energy storage devices, and particularly to a supercapacitive solar cell for energy harvesting and energy storage, and a method of making the supercapacitive solar cell.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In recent years, portable devices have experienced great development putting much strain on energy demand and supply units. The limited resources of petroleum are not enough to fulfill the future energy demands. Numerous methods to convert solar energy to other renewable forms of energy, are known in the art. Commonly used devices to store electrical energy are either batteries or supercapacitors. Supercapacitors are energy storage devices that provide high power peaks with substantial energy density value.

In recent years, supercapacitors responsive to external stimuli including light, pH, mechanical stress, electric and magnetic fields are receiving considerable attention. They can be used in various applications in logic circuits and electronic wearable devices. Light responsive supercapacitors are capable of self-charging under light by converting light energy to electrical energy and store it for further use. They are promising candidates for on-chip micro power energy storage systems. Although several light responsive supercapacitors have been reported in the art, it is still desirable to have light responsive supercapacitors with self-charging ability, higher capacitance, and energy density value than those already known in the art. Accordingly, it is an objective of the present disclosure to provide a supercapacitor which has a self-charging ability and better supercapacitor performance characteristics, such as higher capacitance and energy density.

SUMMARY

In an exemplary embodiment, a light harvesting supercapacitor is described. The light harvesting supercapacitor includes a transparent conducting substrate, an active layer including $TiO_2$ nanoparticles and polyaniline nanoparticles disposed on the transparent conducting substrate, an electrolyte layer including a solid separator and an electrolyte comprising polyvinyl alcohol and at least one ionic material selected from the group consisting of phosphoric acid, sulfuric acid, hydrochloric acid, hydrobromic acid, hydroiodic acid, an alkali metal phosphate salt, an alkali metal sulfate salt, an alkali metal hydroxide, an alkali metal halide, and a mixture of a halogen and an alkali metal halide disposed on the active layer, a carbon electrode disposed on the electrolyte layer, and a metal layer disposed on the (activated) carbon electrode.

In some embodiments, the transparent conducting substrate is fluorine-doped tin oxide (FTO) coated glass.

In some embodiments, the transparent conducting substrate is polyethylene terephthalate.

In some embodiments, the active layer includes a $TiO_2$ sub-layer and a polyaniline sublayer. The $TiO_2$ sub-layer includes the $TiO_2$ nanoparticles, and the polyaniline sub-layer includes the polyaniline nanoparticles.

In some embodiments, the $TiO_2$ sub-layer is disposed on the transparent conducting substrate and the polyaniline sub-layer is disposed on the $TiO_2$ sub-layer such that the polyaniline sub-layer does not contact the transparent conducting substrate.

In some embodiments, the $TiO_2$ nanoparticles are crystalline by PXRD, adopt the anatase crystal structure, and have a mean particle size of 1 to 100 nanometers (nm).

In some embodiments, the polyaniline nanoparticles have a mean particle size of 10 to 200 nm.

In some embodiments, the electrolyte layer includes a paper separator, polyvinyl alcohol, and phosphoric acid.

In some embodiments, the carbon electrode includes activated carbon, conductive carbon, and polyvinylidene fluoride (PVDF).

In some embodiments, the metal layer is an aluminum layer.

In some embodiments, the light harvesting supercapacitor has a specific capacitance of 75 to 125 farad per gram (F/g) at a current density of 0.3 to 0.5 ampere per gram (A/g).

In some embodiments, the light harvesting supercapacitor has an energy density of 17.5-to-27.5-watt hour per kilogram (Wh/kg) and a power density of 11,000 to 14,000 watt per kilogram (W/kg).

In some embodiments, the light harvesting supercapacitor has a bandgap of 2.5 to 2.95 electron volt (eV).

In another exemplary embodiment, a method of preparing the light harvesting supercapacitor including the transparent conducting substrate, the active layer including $TiO_2$ nanoparticles and polyaniline nanoparticles disposed on the transparent conducting substrate, the electrolyte layer including the solid separator and the electrolyte comprising polyvinyl alcohol and at least one ionic material selected from the group consisting of phosphoric acid, sulfuric acid, hydrochloric acid, hydrobromic acid, hydroiodic acid, an alkali metal phosphate salt, an alkali metal sulfate salt, an alkali metal hydroxide, an alkali metal halide, and a mixture of a halogen and an alkali metal halide disposed on the active layer, the carbon electrode disposed on the electrolyte layer, and the metal layer disposed on the (activated) carbon electrode, is described. The method includes coating the transparent conducting substrate with a paste including the $TiO_2$ nanoparticles to form a coated substrate. The method further includes heating the coated substrate to form an intermediate structure, and further immersing the first intermediate structure in a dispersion including the polyaniline nanoparticles and a solvent to form a first device portion. Furthermore, the method includes disposing the carbon electrode on a metal substrate to form a second device portion, and subsequently sandwiching the electrolyte layer between the active layer of the first device portion and the carbon electrode of the second device portion to form the light harvesting supercapacitor.

In some embodiments, the polyaniline nanoparticles are formed by exposing a suspension of polyaniline in a nanoparticle synthesis solvent to a pulsed laser having a wavelength of 525 to 550 nm and a pulse energy of 275 to 425 millijoules per pulse (mJ/pulse).

In some embodiments, the nanoparticle synthesis solvent is an alcohol having 1 to 4 carbon atoms and the polyaniline is present in the suspension in an amount of 1 to 4 milligram per milliliter (mg/mL) of the suspension.

In some embodiments, the method includes immersing the first intermediate structure in a dispersion for 12 to 48 hours to form the first device portion.

In some embodiments, the method includes coating the transparent conducting substrate with the paste by doctor blade-coating to form the coated substrate.

In some embodiments, the transparent conducting substrate is FTO coated glass and the heating is performed at 400 to 600° C.

In an exemplary embodiment, a photovoltaic device including the light harvesting supercapacitor is described.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 13A depicts the self-charging of the supercapacitive solar cell using iodide/triiodide electrolyte under UV and visible light, according to certain embodiments;

FIG. 13B depicts discharging of the supercapacitive solar cell using iodide/triiodide electrolyte under dark conditions, according to certain embodiments;

DETAILED DESCRIPTION

Definitions

Figure 1:
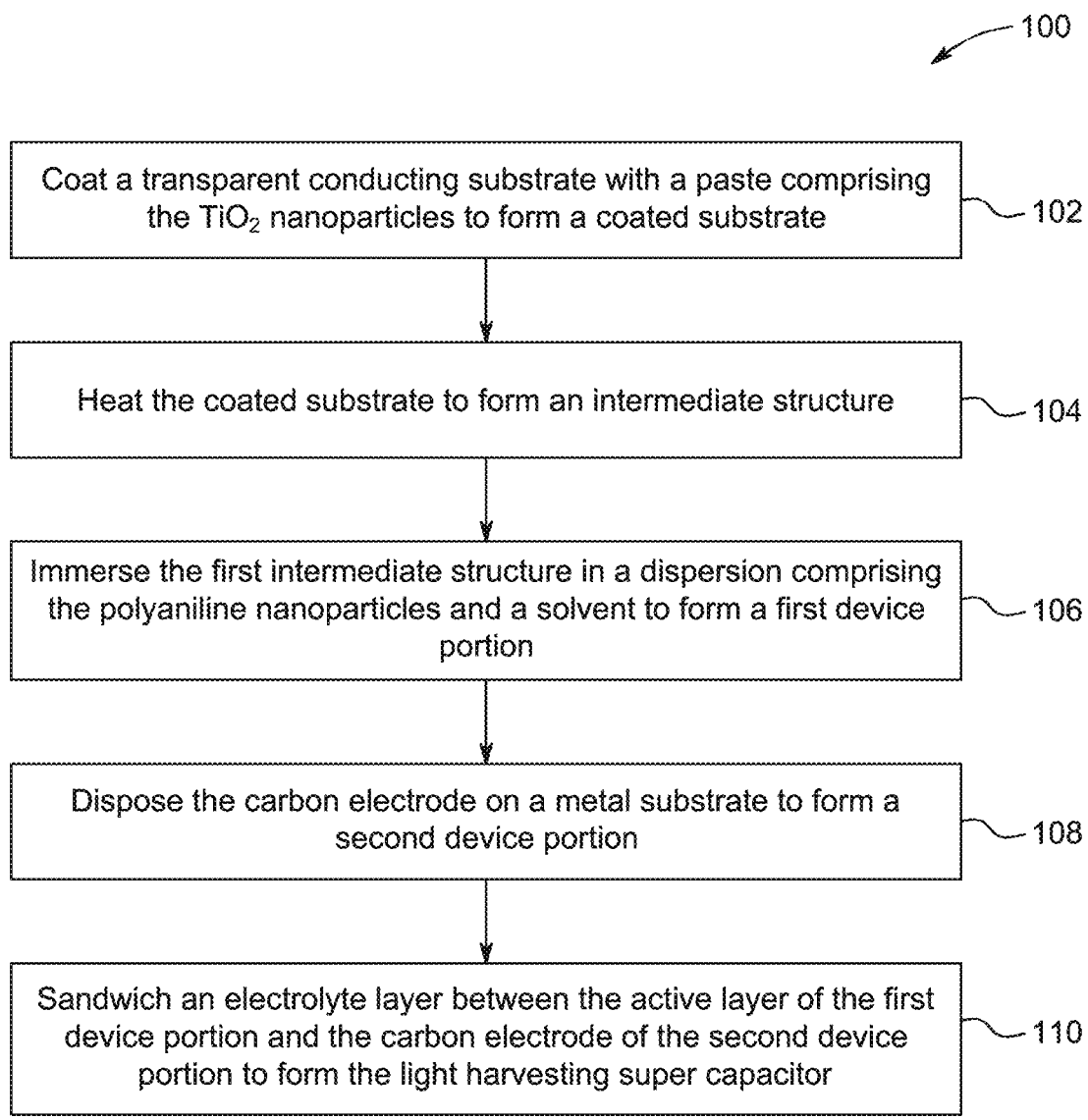
FIG. 1 is a schematic flow diagram of preparing a light harvesting supercapacitor, according to certain embodiments
Figure 2:
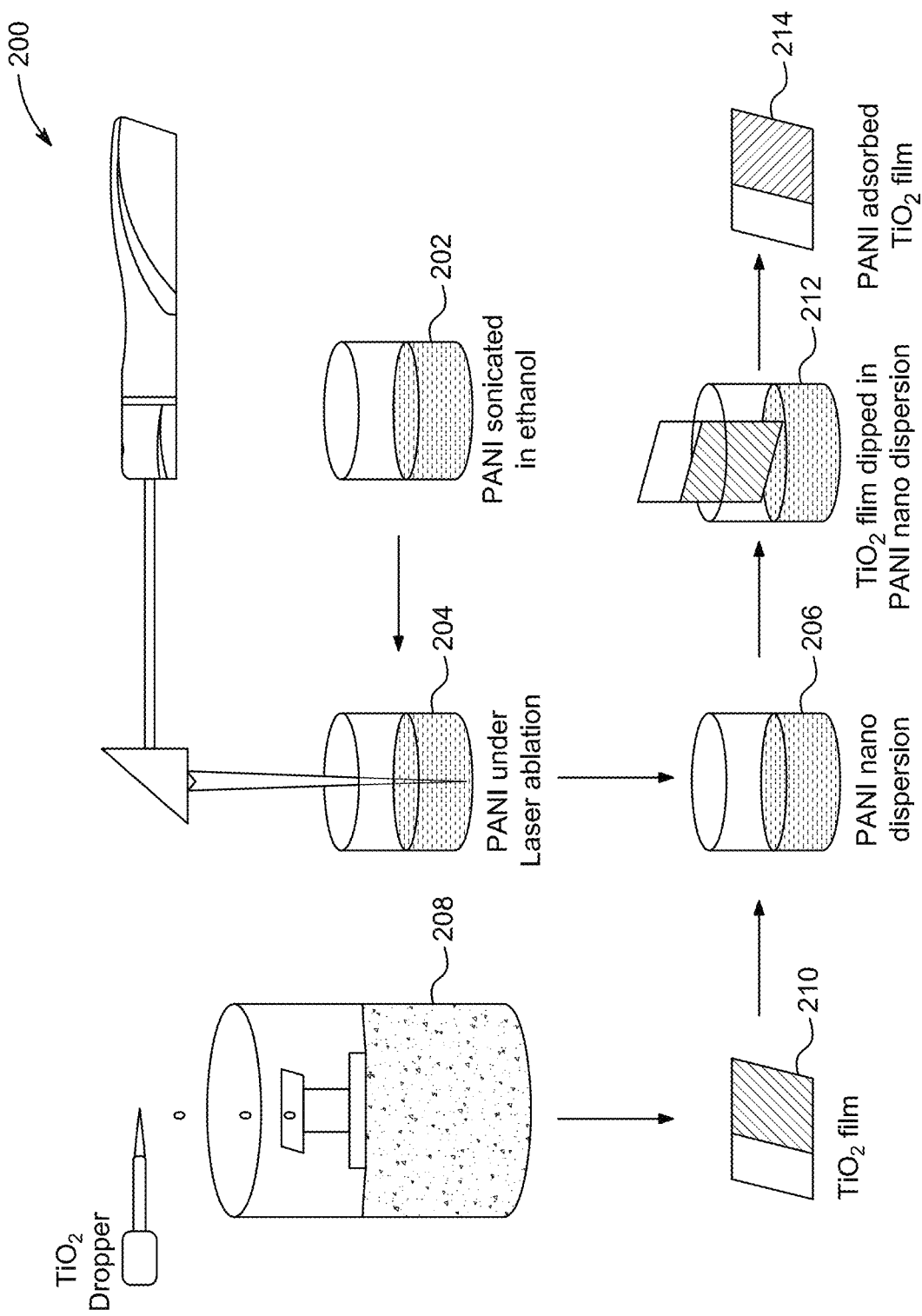
FIG. 2 is a schematic diagram of photo anode preparation, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Light Harvesting Supercapacitor

According to a first aspect, the present disclosure is directed towards a self-charging light harvesting supercapacitor 300 that does not need any external bias for its operation. The terms "light harvesting supercapacitor" or a "supercapacitive solar cell" have been used interchangeably though out the draft. The light harvesting supercapacitor 300 also referred to as a "device" is fabricated using a $TiO_2$ semiconductor as a host material and polyaniline (PAM) nanoparticles coated on $TiO_2$ through adsorption method. The $TiO_2$/PANI film deposited on an FTO conductive glass acts as a photo anode. A back electrode is an activated carbon with a large surface area on aluminum foil. The photo anode and the back electrode are joined together in an asymmetric configuration through an electrolyte layer, including a solid separator and an electrolyte.

In general, the transparent substrate may be any suitable transparent substrate known to one of ordinary skill in the art. The transparent substrate may be rigid or may be flexible. The transparent substrate should be substantially transparent in the visible and/or UV regions. That is, the substrate should permit at least 75%, preferably at least 80%, preferably at least 85%, preferably at least 90%, preferably at least 95%, preferably at least 97.5%, preferably at least 99%, preferably at least 99.5% of incident visible and/or UV radiation to pass through the transparent substrate. Examples of suitable rigid transparent substrates include glass, FTO glass, ITO glass, sapphire (crystalline alumina), aluminum doped zinc oxide (AZO), yttria, silica, yttrium aluminum garnet (YAG), diamond, quartz, poly (methyl methacrylate), polycarbonate, polyethylene, polyethylene terephthalate, polylactic acid, polyvinyl butyral, poly(3,4-ethylenedioxythiophene) (PEDOT) and mixtures or copolymers thereof such as poly(3,4-ethylenedioxythiophene)-tetramethacrylate (PEDOT-TMA) and poly(3,4-ethylenedioxythiophene) polystyrene sulfonate (PEDOT:PSS), and the like. In some embodiments, the transparent substrate is fluorine-doped tin oxide (FTO) coated glass. In some embodiments, the transparent substrate is polyethylene terephthalate. In some embodiments, the polyethylene terephthalate is flexible and/or stretchable.

The device 300 further includes a thin film of an active layer on the transparent substrate. The thickness of the active film may be in a range of a few hundred micrometers to nanometers. In some embodiments, the active layer comprises a $TiO_2$ sub-layer comprising the $TiO_2$ nanoparticles and a polyaniline (PANT) sub-layer comprising the polyaniline (PANT) nanoparticles. In some embodiments, the $TiO_2$ sub-layer is disposed on the transparent substrate and the polyaniline sub-layer is disposed on the $TiO_2$ sub-layer such that the polyaniline sub-layer does not contact the transparent substrate. In some embodiments, the active layer has a thickness of 1 to 500 μm, preferably 2.5 to 490 μm, preferably 5 to 480 μm, preferably 7.5 to 470 μm, preferably 10 to 460 μm, preferably 12.5 to 450 μm, preferably 15 to 440 μm, preferably 17.5 to 430 μm, preferably 20 to 420 μm, preferably 22.5 to 410, preferably 25 to 400 μm. For example, the active layer may have a thickness from 27.5 to 390 μm, or 30 to 380 μm, or 32.5 to 370 μm, or 35 to 360 μm, or 37.5 to 350 μm, or 40 to 340 μm, or 42.5 to 330 μm, or 45 to 320 μm, or 47.5 to 310 μm, or 50 to 300 μm, or 52.5 to 290 μm, or 55 to 280 μm, or 57.5 to 270 μm, or 60 to 260 μm, or 62.5 to 250 μm, or 65 to 240 μm, or 67.5 to 230 μm, or 70 to 220 μm, or 72.5 to 210 μm, or 75 to 200 μm. In some embodiments, the $TiO_2$ sub-layer has a thickness of 0.5 to 490 μm, preferably 1 to 480 μm, preferably 2.5 to 470 μm, preferably 5 to 460 μm, preferably 7.5 to 450 μm, preferably 10 to 440 μm, preferably 12.5 to 430 μm, preferably 15 to 420 μm, preferably 17.5 to 410 μm, preferably 17.5 to 400 μm, preferably 20 to 400 μm. For example, the $TiO_2$ sub-layer may have a thickness from 22.5 to 390 μm, or 25 to 380 μm, or 27.5 to 370 μm, or 30 to 360 μm, or 32.5 to 350 μm, or 35 to 340 μm, or 37.5 to 330 μm, or 40 to 320 μm, or 42.5 to 310 μm, or 45 to 300 μm, or 47.5 to 290 μm, or 50 to 280 μm, or 52.5 to 270 μm, or 55 to 260 μm, or 57.5 to 250 μm, or 60 to 240 μm, or 62.5 to 230 μm, or 65 to 220 μm, or 67.5 to 210 μm, or 70 to 200 μm. In some embodiments, the polyaniline sub-layer has a thickness of 0.5 to 490 μm, preferably 1 to 480 μm, preferably 2.5 to 470 μm, preferably 5 to 460 μm, preferably 7.5 to 450 μm, preferably 10 to 440 μm, preferably 12.5 to 430 μm, preferably 15 to 420 μm, preferably 17.5 to 410 μm preferably 17.5 to 400 μm preferably 20 to 400 μm. For example, the polyaniline sub-layer may have a thickness from 22.5 to 390 μm, or 25 to 380 μm, or 27.5 to 370 μm, or 30 to 360 μm, or 32.5 to 350 μm, or 35 to 340 μm, or 37.5 to 330 μm, or 40 to 320 μm, or 42.5 to 310 μm, or 45 to 300 μm, or 47.5 to 290 μm, or 50 to 280 μm, or 52.5 to 270 μm, or 55 to 260 μm, or 57.5 to 250 μm, or 60 to 240 μm, or 62.5 to 230 μm, or 65 to 220 μm, or 67.5 to 210 μm, or 70 to 200 μm.

In general, the $TiO_2$ nanoparticles can be any shape known to one of ordinary skill in the art. Examples of suitable shapes the $TiO_2$ nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For $TiO_2$ nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the $TiO_2$ nanoparticles are envisioned as having in any embodiments.

In some embodiments, the $TiO_2$ nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of $TiO_2$ nanoparticles having a different shape. As used herein, the term "non-uniform shape" refers to an average consistent shape that differs by more than 10% of the distribution of $TiO_2$ nanoparticles having a different shape. In one embodiment, the shape is uniform and at least 90% of the $TiO_2$ nanoparticles are spherical or substantially circular, and less than 10% are polygonal. In another embodiment, the shape is non-uniform and less than 90% of the $TiO_2$ nanoparticles are spherical or substantially circular, and greater than 10% are polygonal.

In some embodiments, the $TiO_2$ nanoparticles have a mean particle size of 1 to 100 nm, preferably 2.5 to 75 nm, preferably 5 to 60 nm, preferably 7.5 to 50 nm, preferably 10 to 40 nm, preferably 12.5 to 35 nm, preferably about 15 to 30 nm. In embodiments where the $TiO_2$ nanoparticles are spherical, the particle size may refer to a particle diameter. In embodiments where the $TiO_2$ nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the $TiO_2$ nanoparticles have an anisotropic shape such as nanorods, the particle size may refer to a length of the nanorod, a width of the nanorod, an average of the length and width of the nanorod. In some embodiments in which the $TiO_2$ nanoparticles have non-spherical shapes, the particle size refers to the diameter of a sphere having an equivalent volume as the particle. In some embodiments in which the $TiO_2$ nanoparticles have non-spherical shapes, the particle size refers to the diameter of a sphere having an equivalent diffusion coefficient as the particle.

In some embodiments, the $TiO_2$ nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the $TiO_2$ nanoparticles of the present disclosure are monodisperse having a particle size distribution ranging from 80% of the average particle size to 120% of the average particle size, preferably 90-110%, preferably 95-105% of the average particle size. In some embodiments, the $TiO_2$ nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the $TiO_2$ nanoparticles are crystalline by PXRD. In some embodiments, the crystalline $TiO_2$ nanoparticles adopt the anatase crystal structure. In some embodiments, the $TiO_2$ nanoparticles are present in the $TiO_2$ sub-layer as individual nnaoparticles. In some embodiments, the $TiO_2$ nanoparticles are present in the $TiO_2$ sublayer as a monolith, framework, extended network, or other 3D structure comprising $TiO_2$ nanoparticles connected to each other. Such connection can be, for example, as a result of agglomeration or sintering. Such connection may involve contact between adjacent $TiO_2$ nanoparticles such that there is no intervening material, such as organic binders, residual organic solvent, organic plasticizers, and the like. In some embodiments, the 3D structure is porous, the pores being formed from spaces between adjacent $TiO_2$ nanoparticles. In some embodiments, the $TiO_2$ sublayer is substantially free of organic material.

In some embodiments, the $TiO_2$ sub-layer is disposed on the transparent substrate (FTO conductive glass) by a coating method. The coating method may dispose the $TiO_2$ nanoparticles as individual nanoparticles. Such individual nanoparticles may be in the form of a suspension or dispersion in an appropriate dispersing medium, the suspension or dispersion taking the form of a spreadable material such as a viscous fluid, paste, or gel. Examples of components of suspensions or dispersion of $TiO_2$ nanoparticles include, but are not limited to solvents, surfactants, binders, humectants such as ethylene glycol and sorbitol, biocides, viscosity builders such as polyethylene glycol, colorants, pH adjusters, drying agents, defoamers or combinations thereof.

Examples of surfactants include, but are not limited to polyether/polysiloxane copolymers, alkyl-aryl modified methyl-polysiloxanes, acylated polysiloxanes, sorbitan tristearate, sorbitan monopalmitate, sorbitan triolate, mono glyceride stearate, polyoxyethylene nonylphenyl ether, alkyl-di(aminoethyl) glycine, alkyl polyaminoethylglycine hydrochloride, 2-alkyl-n-carboxyethyl-N-hydroxyethyl imidazolinium betaine, and N-tetradecyl-N, N-substituted betaine Examples of binders include, but are not limited to epoxy resins, modified epoxy resins, polyester resins, novolak resins, cellulosic materials, hydroxypropylcellulose, hydroxyethylcellulose, hydroxypropylmethylcellulose, carboxymethylcellulose, copolymers of vinylidene chloride and acrylonitrile, acrylic acid resins, polyvinyl resins, silicone resins, polyamide resins, vinyl alcohol resins, resol resins, acetal resins, polyacrylonitrile resins, formaldehyde resins, polycarbonate resins, polyimide resins, polyethyleneimine, poly(ethyloxazoline), gelatin, starches, dextrin, amylogen, gum arabic, agar, algin, carrageenan, fucoidan, laminaran, corn hull gum, gum ghatti, karaya gum, locust bean gum, pectin, guar gum, epoxy resins produced by the condensation of epichlorohydrin and Bisphenol A or F, epoxy novolak resins, rubber modified epoxy resins, Bisphenol A based polyester resins, epoxydized o-cresylic novolaks, urethane modified epoxy resins, phosphate modified Bisphenol A epoxy resins, cellulose esters, copolymers of vinylidene chloride and acrylonitrile, poly(meth)acrylates, polyvinyl chloride, silicone resins, polyesters containing hydroxy or carboxy groups, polyamides comprising amino groups or carboxy groups, polymers and copolymers of vinyl alcohol, polyvinylimidazole, polyvinylpyrrolidone, polymers and copolymers of vinylphenol, acrylamide, methylol acrylamide, methylol methacrylamide, polyacrylic acid, methacrylic acid, hydroyethyl acrylate, hydroxethyl methacrylate, maleic anhydride/vinyl methyl ether copolymers, novolak resin, resol resin, polyvinyl phenol resin, copolymers of acrylic acid, polyacetal, poly(methyl methacrylate), polymethacrylic acid, polyacrylonitrile, cellulose acetate, cellulose acetate butyrate, cellulose acetate propionate, melamine formaldehyde resins, polycarbonates, polyimides and urea formaldehyde resins In some embodiments, heat treatment at an elevated temperature is used following the coating method to remove the non-$TiO_2$ components of the suspension or dispersion, such as organic solvents or binders.

PANI is a conductive polymer and has been used as a light harvesting agent. In some embodiments, the PANI nanoparticles are prepared using pulsed laser ablation in liquid (PLAL). The pulsed laser ablation in liquid forms PANI nanoparticles from a bulk sample of PANI by ablation followed by stabilization of small particles in the liquid. In general, the PANI nanoparticles may be any suitable shape as described above. In some embodiments, the PANI nanoparticles are substantially spherical. In some embodiments, The PANI nanoparticles have a mean particle size of 5 to 200 nm, preferably 10 to 175 nm, preferably 15 to 150 nm, preferably to 130 nm, preferably 25 to 125 nm. In some embodiments, the PANI nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the PANI nanoparticles of the present disclosure are monodisperse having a particle size distribution ranging from 80% of the average particle size to 120% of the average particle size, preferably 90-110%, preferably 95-105% of the average particle size. In some embodiments, the PANI nanoparticles are not monodisperse.

In general, the PANI nanoparticles may be formed of PANI having any suitable mean molecular weight. For example, the PANI nanoparticles may be formed from PANI having a mean molecular weight of ~1,000, ~5,000, ~10,000, ~15,000, ~20,000, ~25,000, ~30,000, ~35,000, ~40,000, ~50,000, ~55,000, ~60,000, ~65,000, ~70,000, ~75,000, ~80,000, ~90,000, ~100,000, ~110,000, ~125,000, ~150,000, ~175,000, ~200,000, ~225,000, or ~250,000. Here, the mean molecular weight being "approximately X" or "~X" refers to "X+/−10%". In some embodiments, the mean molecular weight is a number average. In some embodiments, the mean molecular weight is a weight average.

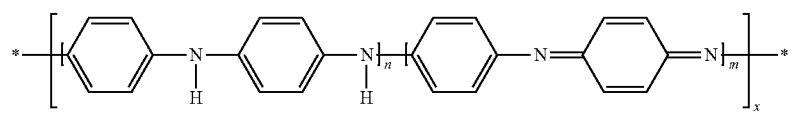

(1)

Polyaniline (PANT) may exist in a number of idealized oxidation states. Referring to structure (1) above, the oxidation state of the PANI may be determined by n and m, where 0≤n,m≤1. Leucoemeraldine with n=1, m=0 is the fully reduced state. Pernigraniline is the fully oxidized state (n=0, m=1) with imine links instead of amine links. The emeraldine form of polyaniline is intermediate between these two (0<n,m<1), ideally with n=m=0.5. Often, it referred to as emeraldine base (EB) if neutral, see structure (2) below. If protonated, it is typically referred to as emeraldine salt (ES), with the imine nitrogens protonated by an acid, see structure (3) below. In structure (3), X⁻ represents anions associated with the positively charged PANI, such as halide anions, nitrate anions, carboxylate anions, or sulfonate anions. Leucoemeraldine and pernigraniline are poor conductors, even when doped with an acid. Preferably, the PANI is an emeraldine PANI. In preferred embodiments, the PANI is an emeraldine salt PANI.

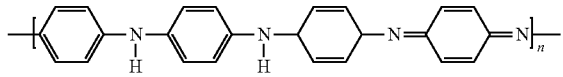

(2)

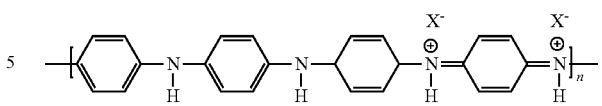

(3)

The electrolyte includes polyvinyl alcohol and at least one ionic material selected from the group consisting of phosphoric acid, sulfuric acid, hydrochloric acid, hydrobromic acid, hydroiodic acid, an alkali metal phosphate salt, an alkali metal sulfate salt, an alkali metal hydroxide, an alkali metal halide, and a mixture of a halogen and an alkali metal halide disposed on the active layer. In some embodiments, the ionic material is phosphoric acid. In some embodiments, the ionic material is a mixture of iodine ($I_2$) and potassium iodide. Such a mixture may form triiodide ($I_3^-$) anions which are useful as charge carriers. Such an electrolyte may be referred to as an "iodide/triiodide" electrolyte.

The solid separator may be any suitable porous material. In The solid separator may provide structural integrity, such as rigidity or a barrier or container for the electrolyte, to the electrolyte layer. The solid separator should be capable of allowing the electrolyte to exist within the pores of and about an exterior or the solid separator such that electrical continuity and therefore electrical conduction is possible through the electrolyte layer. Such electrical conduction may be mediated by the ionic substance which exists as positive and negative ions. In some embodiments, the positive and/or negative ions of the ionic substance are capable of moving within the electrolyte and/or the solid separator. Examples of suitable materials which may for the solid separator include, but are not limited to fabrics such as cotton, nylon, and polyesters; materials formed from glass fibers such as fiberglass; polymers such as polyethylene, polypropylene, poly (tetrafluoroethylene), and polyvinyl chloride; ceramics; and naturally occurring substances such as rubber, asbestos, and wood. In some embodiments, the solid separator is paper. In some embodiments, the electrolyte layer 308 includes a paper separator soaked with polyvinyl alcohol and phosphoric acid. In this context, "soaked" refers to the solid separator being exposed to the electrolyte such that the electrolyte enters and exists within the pores of the solid separator. In some embodiments, the soaking refers to immersing the paper in or otherwise exposing the paper to a mixture of the polyvinyl alcohol and the ionic substance such that the polyvinyl alcohol and ionic substance exist within spaces between the fibers which form the paper such that continuous pathways exist for electrical charge to flow from one side of the paper to another side of the paper, the electrical charge flow being mediated by the ionic substance and the polyvinyl alcohol.

The device 300 further includes a carbon electrode disposed on the electrolyte layer. In some embodiments, the carbon electrode comprises a carbon material and a binder. Examples of carbon nanomaterials include carbon nanotubes, carbon nanobuds, carbon nanoscrolls, carbon dots, activated carbon, carbon black, conductive carbon, graphene, graphene oxide, reduced graphene oxide, and nanodiamonds.

The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If $m=0$, the nanotubes are called zigzag type nanotubes. If $n=m$, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes. Graphene may be in the form of graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene. Graphene may be in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates. Graphene may be pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. Alternatively, the graphene may be functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene. Alternatively, the graphene may be reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

The carbon nanomaterial may be activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

The carbon nanomaterial may be carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

The carbon nanomaterial may be conductive carbon. Conductive carbon refers to a specific type of activated carbon or carbon black which is amorphous and is a good conductor of electricity, typically having a volume resistivity of 0.01 to 0.1 $\Omega m$.

In some embodiments, a single type of carbon nanomaterial is used as described above. In alternative embodiments, mixtures of types of carbon nanomaterials are used.

Examples of binders commonly used with carbon electrodes include, but are not limited to polyvinylalochol (PVA), sulfosuccinic-acid (SSA), polytetrafluoroethylene (PTFE), polyvinylidenefluoride (PVDF), and phenolic/resol type polymers crosslinked with, for example poly(methyl vinyl ether-alt-maleic anhydride), poly(methyl vinyl ether-alt-maleic acid), and/or poly(acrylamide-co-diallyldimethylammonium chloride) (PDADAM).

In some embodiments, the carbon electrode comprises activated carbon, conductive carbon, and PVDF. The light harvesting supercapacitor further includes a metal layer disposed on the (activated) carbon electrode. In general the metal lay may be any suitable metal known to one of ordinary skill in the art. In some embodiments, the metal layer is an aluminum layer.

In some embodiments, the light harvesting supercapacitor has a specific capacitance of 75 to 125 F/g, preferably 85 to 122.5 F/g, preferably 95 to 120 F/g, preferably 100 to 117.5 F/g, preferably 105 to 115 F/g, preferably 107.5 to 112.5 F/g, preferably 109 to 110 F/g at a current density of 0.3 to 0.5 A/g, preferably 0.325 to 0.475 A/g, preferably 0.35 to 0.45 A/g, preferably 0.375 to 0.425 A/g, preferably 0.4 A/g.

In some embodiments, the light harvesting supercapacitor has an energy density of 17.5 to 27.5 W·h/Kg, preferably 18 to 27 W·h/Kg, preferably 18.5 to 26.5 W·h/Kg, preferably 19 to 26 W·h/Kg, preferably 19.5 to 25.5 W·h/Kg, preferably 20 to 25 W·h/Kg, preferably 20.5 to 24.5 W·h/Kg, preferably 21 to 24 W·h/Kg, preferably 21.5 to 23.5 W·h/Kg, preferably 22 to 23 W·h/Kg, preferably 22.5 to 22.75 W·h/Kg, preferably 22.6 W·h/Kg. In some embodiments, the light harvesting supercapacitor has a power density of 11,000 to 14,000 W/Kg, preferably 11,250 to 13,750 W/Kg, preferably 11,500 to 13,500 W/Kg, preferably 11,750 to 13,250 W/Kg, preferably 12,000 to 13,000 W/Kg, preferably 12,100 to 12,900 W/Kg, preferably 12,200 to 12,800 W/Kg, preferably 12,250 to 12,750 W/Kg, preferably 12,300 to 12,700 W/Kg, preferably 12,350 to 12,650 W/Kg, preferably 12,400 to 12,600 W/Kg, preferably 12,450 to 12,550 W/Kg preferably 12,500 W/Kg.

In some embodiments, the light harvesting supercapacitor has a bandgap of 2.5 to 2.95 eV, preferably 2.55 to 2.85 eV, preferably 2.6 to 2.8 eV, preferably 2.625 to 2.775 eV, preferably 2.65 to 2.75 eV, preferably 2.675 to 2.725 eV, preferably 2.70 eV.

In some embodiments, the device 300 of the present disclosure forms part of a photovoltaic cell. The photovoltaic cell may further comprise any other suitable components which would be recognized by one of ordinary skill in the art as useful for forming a solar cell using the light harvesting supercapacitor.

Method of Forming the Light Harvesting Supercapacitor

Referring to FIG. 1, a schematic flow diagram of the method 100 of preparing the light harvesting supercapacitor 300 is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes coating the transparent substrate with a paste comprising the $TiO_2$ nanoparticles to form a coated substrate. The transparent substrate may be as described above. The paste comprising the $TiO_2$ nanoparticles may be as described above. In some embodiments, the transparent substrate is FTO coated glass. In general, the method of coating may be any suitable method of coating a substrate with a paste. Examples of such coating method include, but are not limited to, spin coating, doctor blade-coating, dip coating, screen printing, inkjet printing, aerosol jet printing, metering rod coating, slot casting, and spray coating. In some embodiments, the coating is doctor blade coating.

At step 104, the method 100 includes heating the coated substrate to form an intermediate structure. In some embodiments, the coated substrate is heated to a temperature range of 400° C. to 600° C., preferably 425 to 575° C., preferably 450 to 550° C., preferably 475 to 525° C., preferably 490 to 510° C., preferably 500° C. to form the intermediate structure. The heating may be performed by any of the methods conventionally known in the art. The heating may be useful for removing non-$TiO_2$ constituents of the paste as described above.

At step 106, the method 100 includes immersing the first intermediate structure in a dispersion comprising the PANI nanoparticles and a solvent to form a first device portion. In some embodiments, the thickness of the first device portion can be adjusted by controlling the size of the PANI nanoparticles. In some embodiments, the PANI nanoparticles are prepared by a pulsed laser ablation in liquid (PLAL) technique. The PLAL technique involves exposing a suspension of PANI in a nanoparticle synthesis solvent to a pulsed laser having a wavelength of 520 nm to 550 nm, preferably 522 to 546 nm, preferably 524 to 542 nm, preferably 526 to 538 nm, preferably 528 to 536 nm, preferably 530 to 534 nm, preferably 532 nm and a pulse energy of 275 mJ/pulse to 425 mJ/pulse, preferably 280 to 420 mJ/pulse, preferably 285 to 415 mJ/pulse, preferably 290 to 410 mJ/pulse, preferably 295 to 405 mJ/pulse, preferably 300 to 400 mJ/pulse, preferably 305 to 395 mJ/pulse, preferably 310 to 390 mJ/pulse, preferably 315 to 385 mJ/pulse, preferably 320 to 380 mJ/pulse, preferably 325 to 375 mJ/pulse, preferably 330 to 370 mJ/pulse, preferably 335 to 365 mJ/pulse, preferably 340 to 360 mJ/pulse, preferably 345 to 355 mJ/pulse, preferably 350 mJ/pulse. In some embodiments, the nanoparticle synthesis solvent is an alcohol having 1 to 4 carbon atoms. Examples of such alcohols include, but are not limited to methanol, ethanol, n-propanol, 2-propanol, n-butanol, 2-butanol, ethylene glycol, propylene glycol, diethylene glycol, and glycerol. In some embodiments, the alcohol having 1 to 4 carbon atoms is ethanol. In some embodiments, the polyaniline is present in the suspension in an amount of 1 to 4 mg/mL, preferably 1.25 to 3.75 mg/mL, preferably 1.5 to 3.5 mg/mL, preferably 1.75 to 3.25 mg/mL, preferably 2 to 3 mg/mL, preferably 2.1 to 2.9 mg/mL, preferably 2.2 to 2.8 mg/mL, preferably 2.3 to 2.7 mg/mL, preferably 2.4 to 2.6 mg/mL, preferably 2.5 mg/mL of suspension. In some embodiments, the first intermediate structure is immersed in the dispersion for a period of 12 to 48 hours. The first intermediate structure i.e., the FTO conductive glass disposed with the $TiO_2$/PANI film forms the photoanode.

At step 108, the method 100 includes disposing the carbon electrode on a metal substrate to form a second device portion. In general, the disposing may be performed by any suitable technique, such as those described above. In some embodiments, the carbon electrode includes an activated carbon, conductive carbon, and PVDF, as described above. In such embodiments, the activated carbon, conductive carbon, and PVDF may be mixed to form a composite material which is then disposed on the metal substrate. In some embodiments, the metal substrate is aluminum as described above. The carbon electrode together with the metal substrate forms the back electrode in the device 300.

At step 110, the method 100 includes sandwiching the electrolyte layer 308 between the active layer (30 of the first device portion and the carbon electrode 310 of the second device portion to form the light harvesting supercapacitor 300. The electrolyte layer 308 includes a solid separator and an electrolyte comprising polyvinyl alcohol and at least one ionic material selected from the group consisting of phosphoric acid, sulfuric acid, hydrochloric acid, hydrobromic acid, hydroiodic acid, an alkali metal phosphate salt, an alkali metal sulfate salt, an alkali metal hydroxide, an alkali metal halide, and a mixture of a halogen and an alkali metal halide disposed on the active layer.

The examples below are intended to further illustrate protocols for preparing and characterizing the light harvesting supercapacitor and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

The following examples describe and demonstrate exemplary embodiments of the light harvesting self-charging supercapacitor as described herein. The examples are provided solely for the purpose of illustration and are not to be construed as limitations of the present disclosure, as many variations thereof are possible without departing from the spirit and scope of the present disclosure.

Materials Used

PANI (emeraldine salt), ethanol, Acetone and isopropanol were purchased from Sigma Aldrich™. $TiO_2$ nano paste and FTO conductive glass slides were purchased from Solaronix. 1-Methyl-2-pyrrolidone (NMP), N,N-Dimethyl acetamide (DMAc) were purchased from Merck™, PVDF (polyvinylidene fluoride) binder, HSV 900, timical super C65 (conductive additive) and active carbon were purchased from MTI Corp™. All the chemicals were of analytical grade and were used without any further purification Method of Preparation of Photo Anode Facile, green and environmentally friendly method (200) of pulsed laser ablation (PLAL) in liquid was used to synthesize nano PANI. For this purpose, at step 202, 50 mg of PANI was dispersed in 20 ml of ethanol followed by 1 hour of sonication to obtain a mixture. At step 204, the mixture was further irradiated by nano second Nd-YAG laser operating at a second harmonic (532 nm wavelength) under the fluence of 350 mJ energy per pulse. At step 206, the mixture was stirred continuously using a magnetic stirrer to achieve homogenous ablation (PANT nano-dispersion). The nano synthesis was completed after 20 min of laser ablation. FTO conductive glass slide was used as a substrate to deposit $TiO_2$/PANI film. For this purpose, the FTO glass was cleaned with de-ionized water, ethanol, acetone and isopropanol followed by 30 min of sonication to remove all possible organic pollutants. At step 208, $TiO_2$ nano paste was coated on FTO slide using a spin coater (provided by Laurell technology corp.). The total area coated by $TiO_2$ nano paste was maintained at 1 square centimeter ($cm^2$). At step 210, the FTO slide with $TiO_2$ film was heated at a temperature of 500° C. to remove all the organic binders. At step 212, the FTO conductive glass slide with the $TiO_2$ film was cooled slowly to room temperature to obtain a $TiO_2$ film. At step 214, the $TiO_2$ film was immersed in PANI nano-dispersion for 24 hours to obtain a PANI adsorbed film (216).

Architecture of the Light Harvesting Supercapacitor

Figure 3:
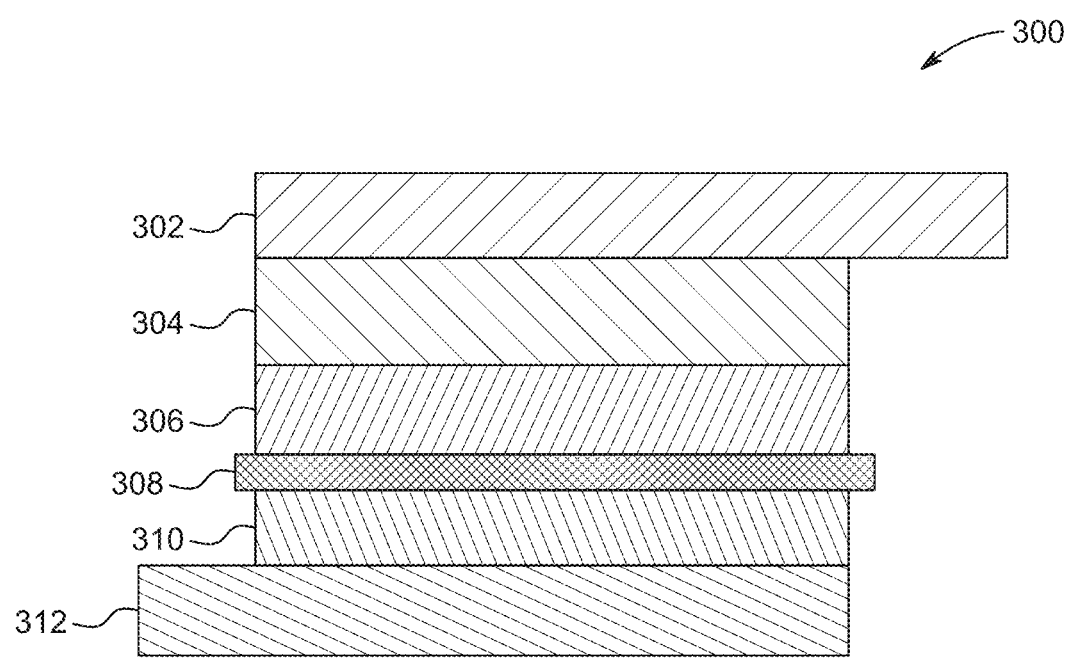
FIG. 3 depicts architecture of the light harvesting supercapacitor, according to certain embodiments.

The device 300 was fabricated in an asymmetric configuration (FTO/$TiO_2$+PANI/separator/AC/Al) as shown in FIG. 3. The photo anode was prepared by the PLAL method, by immersing the FTO conductive glass slide 302 with the $TiO_2$ film 304 into PANI dispersion 306. The back electrode or a counter electrode was prepared by coating activated carbon slurry 310 on Al current collector using an automatic doctor blade coating machine. An activated carbon paste 310 was prepared using PVDF, active carbon (AC), conductive carbon (CC) and NMP. The electrolyte layer 308 was sandwiched between the active layer of the first device portion and the carbon electrode 310 of the second device portion to form the light harvesting supercapacitor 300. The electrolyte layer 308 was polyvinyl alcohol-phosphoric acid (PVA-$H_3PO_4$), which acted as a mediator between the photo anode and the back electrode.

Schematic Diagram Explaining Light Harvesting Mechanism

Figure 4A:
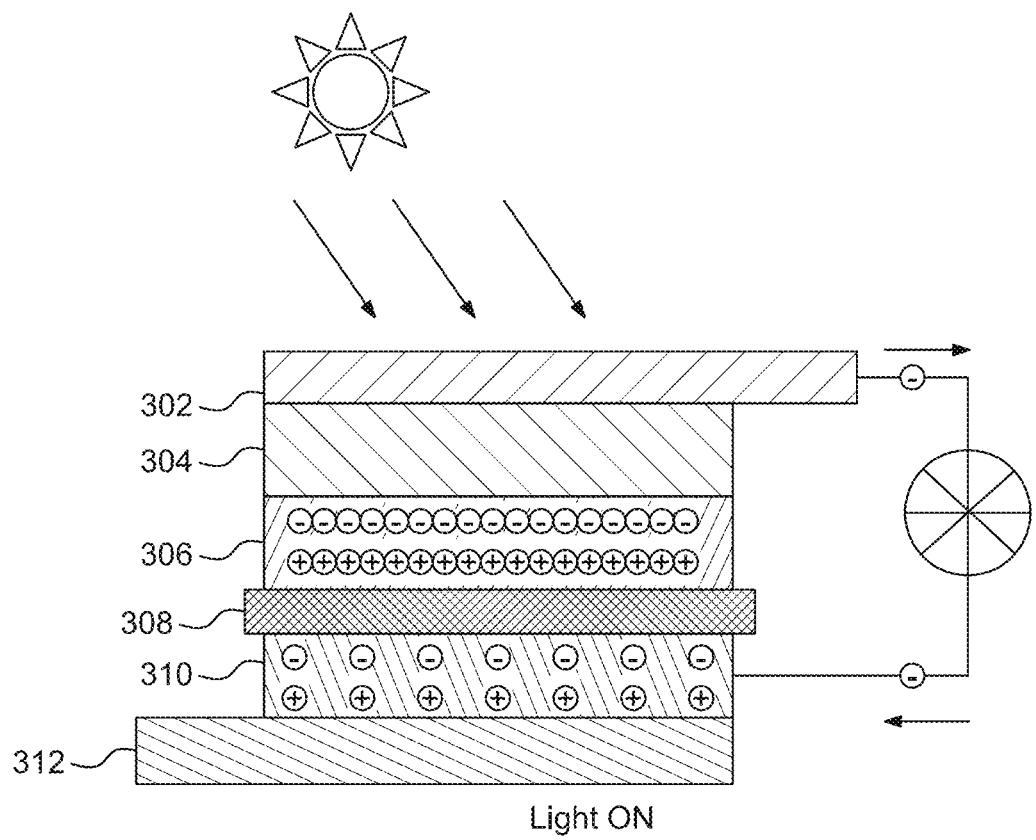
FIG. 4A depicts a schematic diagram of the light harvesting supercapacitor explaining light harvesting and charge transfer mechanism, when light is ON, according to certain embodiments.
Figure 4B:
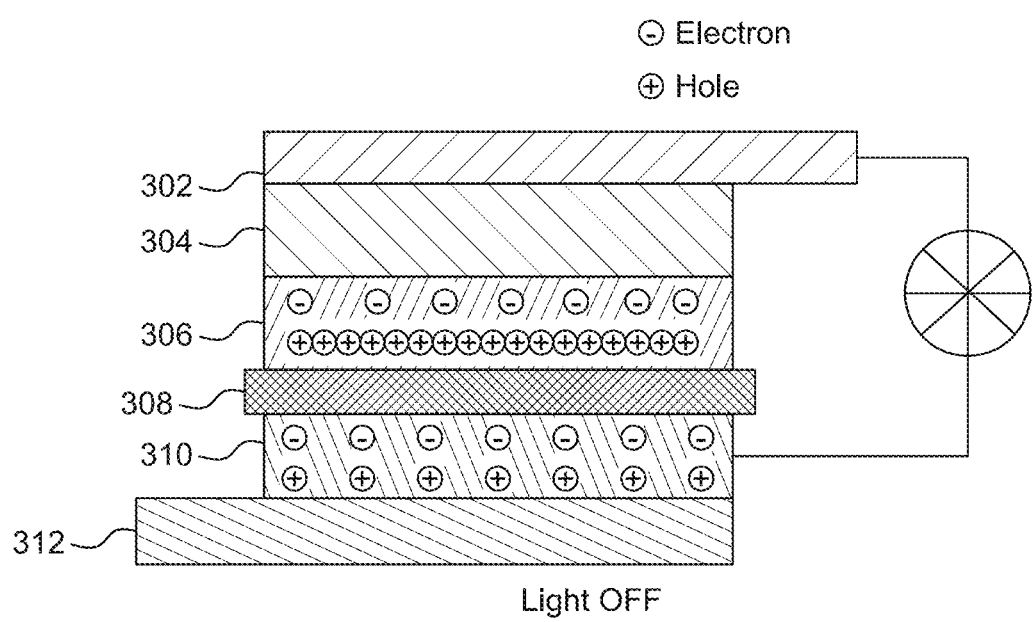
FIG. 4B depicts a schematic diagram of the light harvesting supercapacitor explaining light harvesting and charge transfer mechanism, when light is OFF, according to certain embodiments.

FIGS. 4A-4B are schematic diagrams depicting the light harvesting and charge storage ability of the device 300. $TiO_2$ is a well-known semi-conductor with a band gap in UV region. On the other hand, the PANI is a narrow band gap semi-conductor with its conduction band slightly above the conduction band of the $TiO_2$ according to eV v/s NHE scale. When the light is turned ON, PANI absorbs a photon in the visible region and excites its electron to the conduction band of the PANI 306. This electron is then transferred to the conduction band of the $TiO_2$ 304 and is further transferred to FTO coated glass 302. This electron further moves to the outer circuit and reaches the counter electrode (310 and 312). The resistance between the counter electrode (310 and 312) and photo anode (302, 304, and 306) was high enough to delay the recombination of that electron, thereby giving a temporary effect of charge storage (FIG. 4A). When the light is turned OFF, the device 300 showed capacitance because of the slow recombination rate of electrons and holes (FIG. 4B).

Material Characterization

Figure 5:
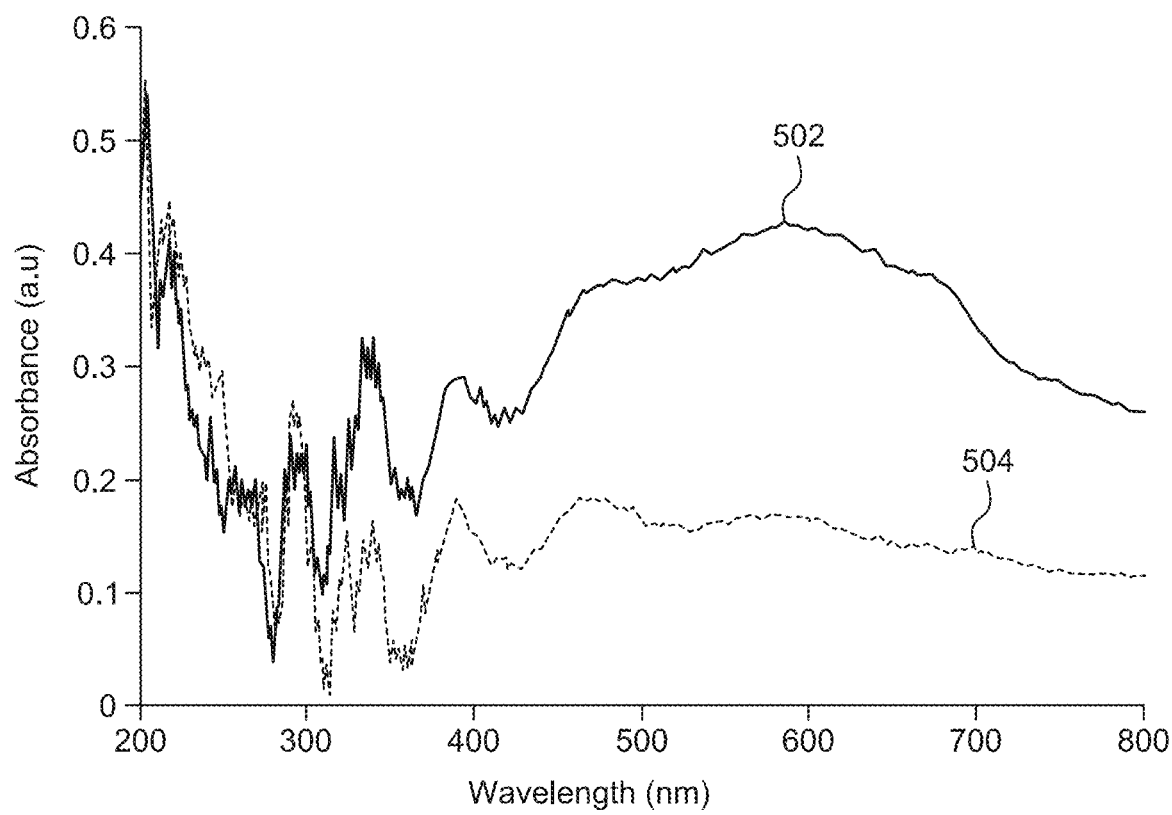
FIG. 5 depicts an ultraviolet-visible (UV-vis) absorption spectra of $TiO_2$ and PANI adsorbed $TiO_2$ film, according to certain embodiments.
Figure 6A:
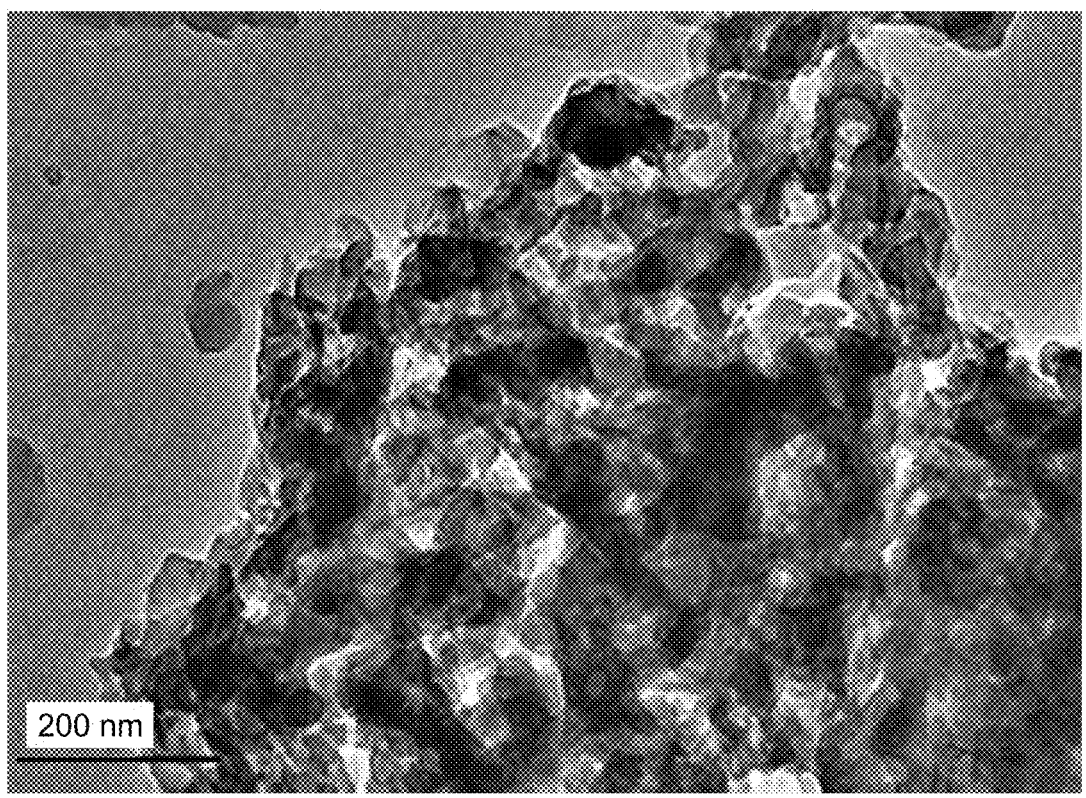
FIG. 6A depicts a Transmission Electron Microscope (TEM) image of PANI after laser ablation, according to certain embodiments.
Figure 6B:
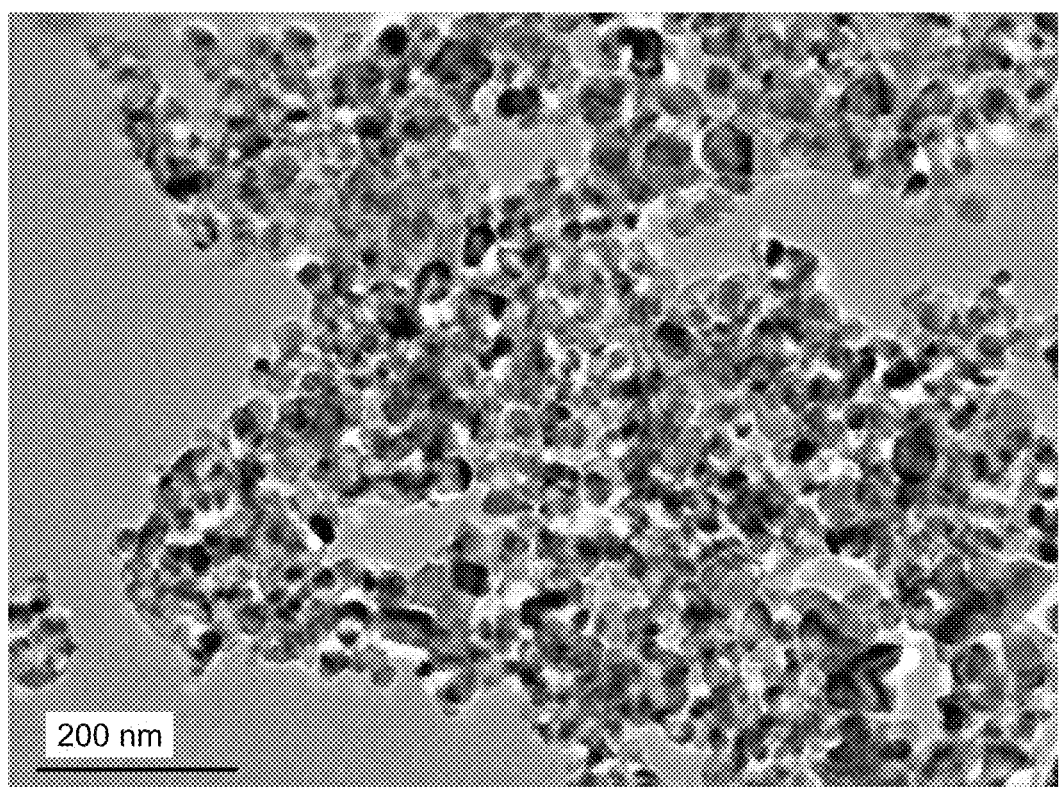
FIG. 6B depicts a TEM image of $TiO_2$ nano particles, according to certain embodiments.
Figure 7B:
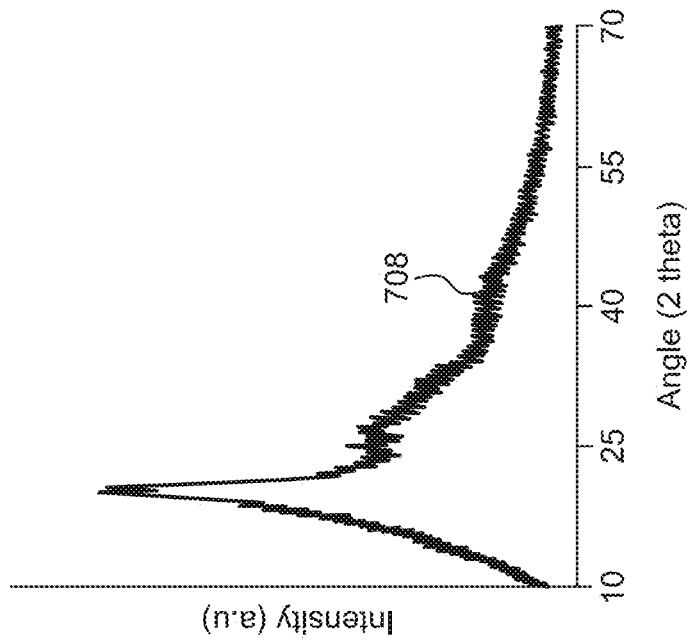
FIG. 7B depicts an XRD pattern of PANI powder, according to certain embodiments.
Figure 7A:
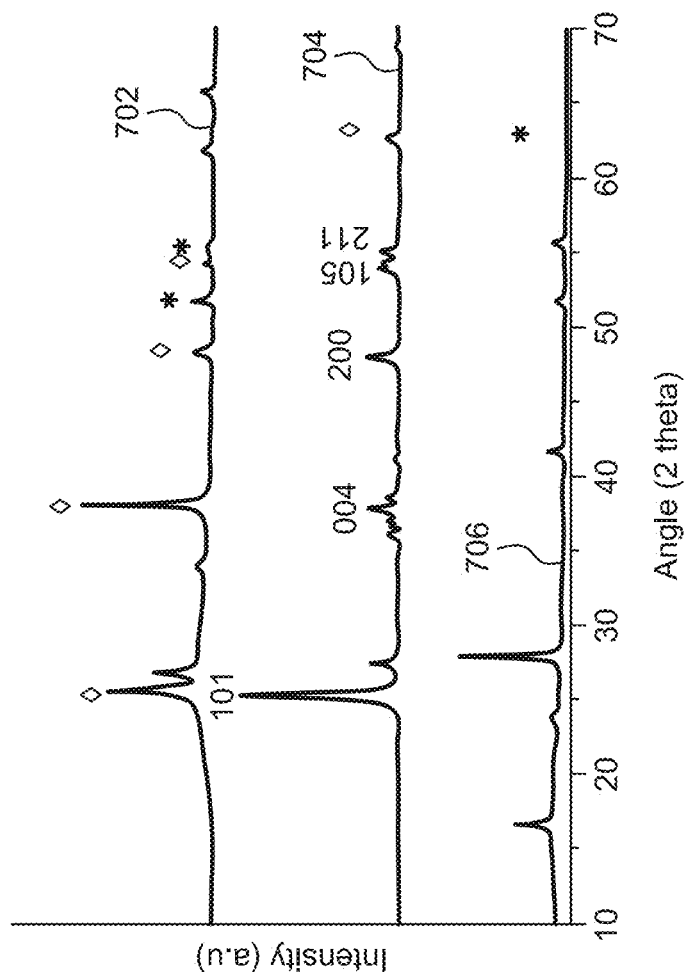
FIG. 7A depicts X-ray Diffraction (XRD) pattern for FTO conductive glass, $TiO_2$ nano powder, and $TiO_2$/PANI coated FTO conductive glass, according to certain embodiments.

The optical properties of the synthesized materials were investigated using UV-vis spectrophotometry. The $TiO_2$ shows an absorption peak in the UV region of the spectrum 504 because of its large band gap, well known from the literature. The addition of PANI to $TiO_2$ shows an extra wide peak in the visible region of light 502 because of the small band gap energy of PANI (as shown in the FIG. 5. The absorption peak in the visible region confirms the optical activity of the device 300 in the visible region of spectrum. The morphology of the synthesized nano material was investigated using TEM. The nano sized PANI particles after laser ablation can be observed in the FIG. 6A by contrast produced by the grain boundaries of the nano particles. The nano spheres of $TiO_2$ with size ranging from 25 nm to 50 nm have been shown in the FIG. 6B. The crystal structure of the synthesized nano materials was studied using XRD, and the results of this study were presented in the FIG. 7A. The XRD spectra for FTO conductive glass 706, $TiO_2$ nano powder 704, and $TiO_2$/PANI coated FTO conductive glass or $TiO_2$ sensitized PANI 702 is shown in FIG. 7A. $TiO_2$ major peaks at 101, 004, 200, 105, and 211 confirm its anatase phase. The corresponding peaks of FTO 702 and $TiO_2$ 704 have been mentioned in the spectrum of the composite sample. The XRD spectrum for pure PANI 708 is depicted in the FIG. 7B.

Device Characterization

Figure 8:
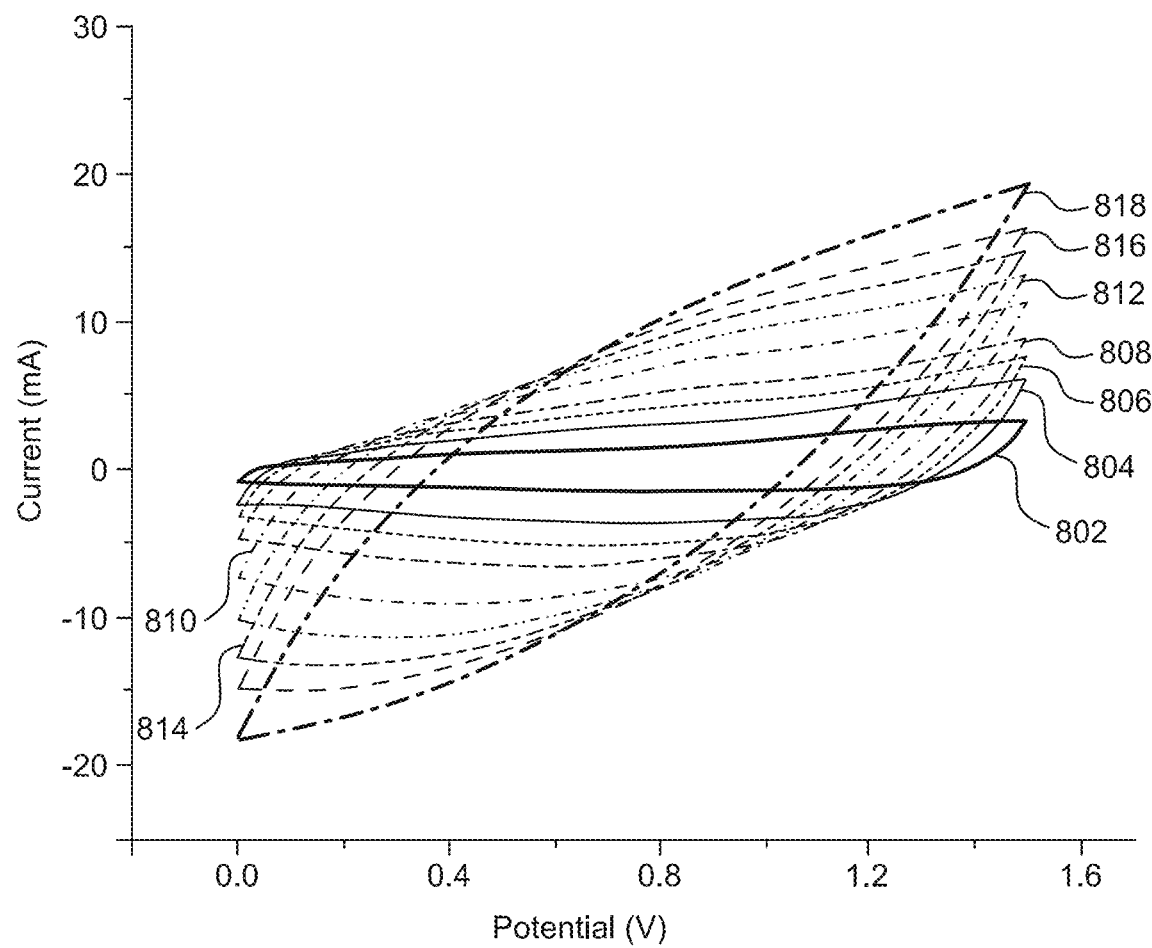
FIG. 8 depicts cyclic voltammetry (CV) curves for a supercapacitive solar cell using PVA-$H_3PO_4$ electrolyte in two electrode assembly at different scan rates ranging from 20 mV s$^{-1}$ to 400 mV s$^{-1}$, according to certain embodiments.

The supercapacitive solar cell or the device 300 was further characterized using cyclic voltammetry (CV), galvanostatic charge discharge (GCD) and electrochemical impedance spectroscopy (EIS). The CV curves for the device 300 at different scan rates ranging for 400 mV $s^{-1}$ (818), 300 mV $s^{-1}$ (816), 250 mV $s^{-1}$ (814), 200 mV $s^{-1}$ (812), 150 mV $s^{-1}$ (810), 100 mV $s^{-1}$ (808)), 75 mV $s^{-1}$ (806), 50 mV s$^{-1}$ (804), and 20 mV s$^{-1}$ (802) in a potential range of 0 V to 1.5 V are depicted in the FIG. 8. The CV curves show no extra unwanted peak demonstrating the stability of the device 300 within the applied potential window.

Figures 9A, 9B:
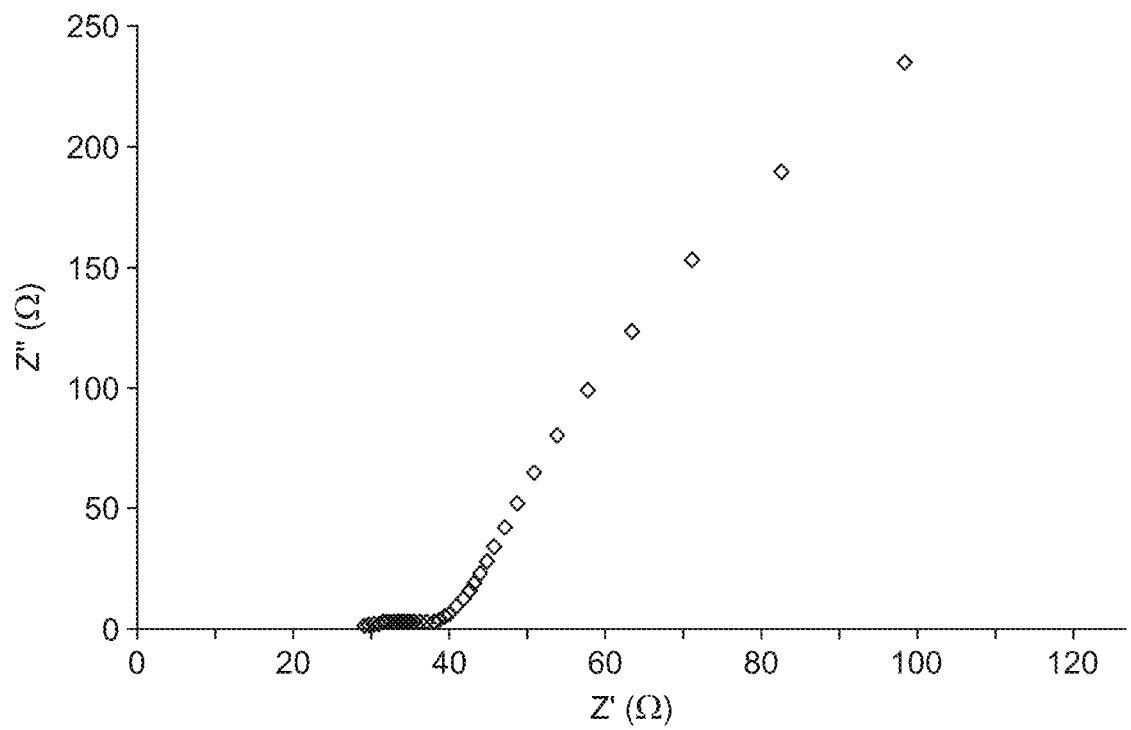
FIG. 9A is a Nyquist plot for the light harvesting supercapacitor or a supercapacitive solar cell using electrochemical impedance spectroscopy (EIS), according to certain embodiments.
FIG. 9B is a magnified Nyquist plot to show the internal resistance of the light harvesting supercapacitor, according to certain embodiments.

EIS was used to understand the resistance analysis of the device 300 by drawing a Nyquist plot as shown in FIG. 9A. The Nyquist plot determines the internal resistance of the device 300. The enlarged graph was shown in the FIG. 9B. The non-zero intersection on the X-axis that is around ~28Ω shows the resistance offered by the FTO electrode. The radius of the semi-circle in the Nyquist plot gives charge transfer resistance that is measured to be Rct≈4.5Ω.

Figure 10A:
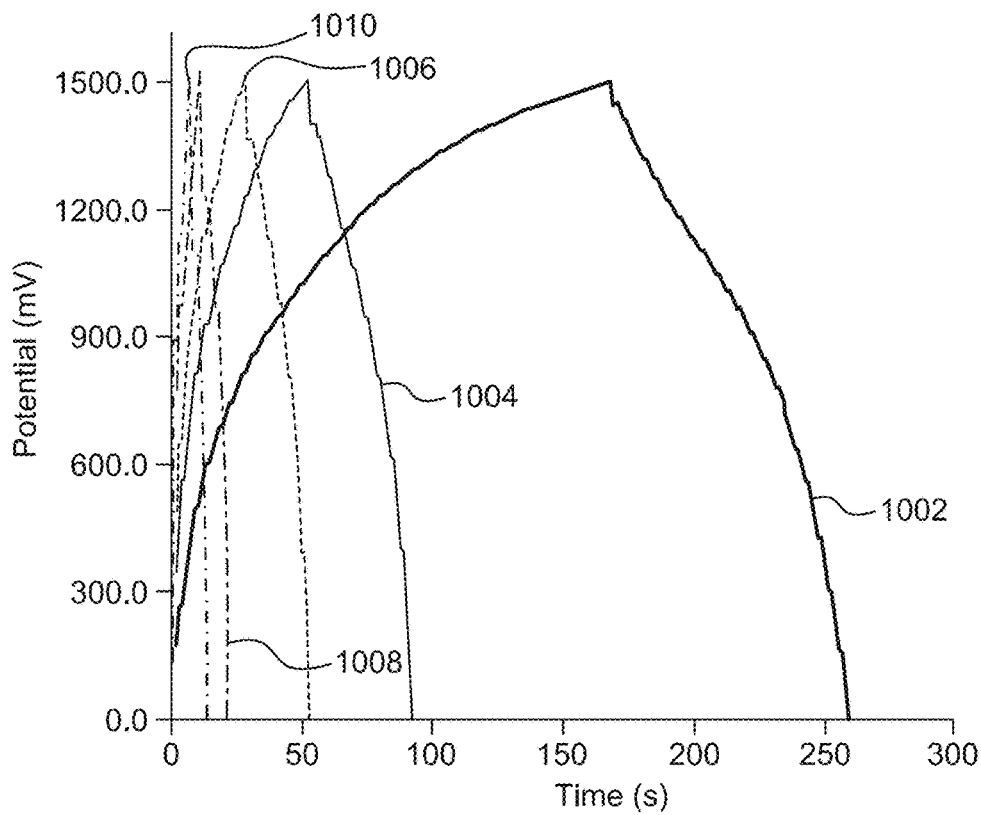
FIG. 10A is a galvanostatic charge discharge (GCD) measurements for the supercapacitive solar cell at different current densities ranging from 0.4 A g$^{-1}$ to 4.2 A g$^{-1}$, according to certain embodiments.
Figure 10B:
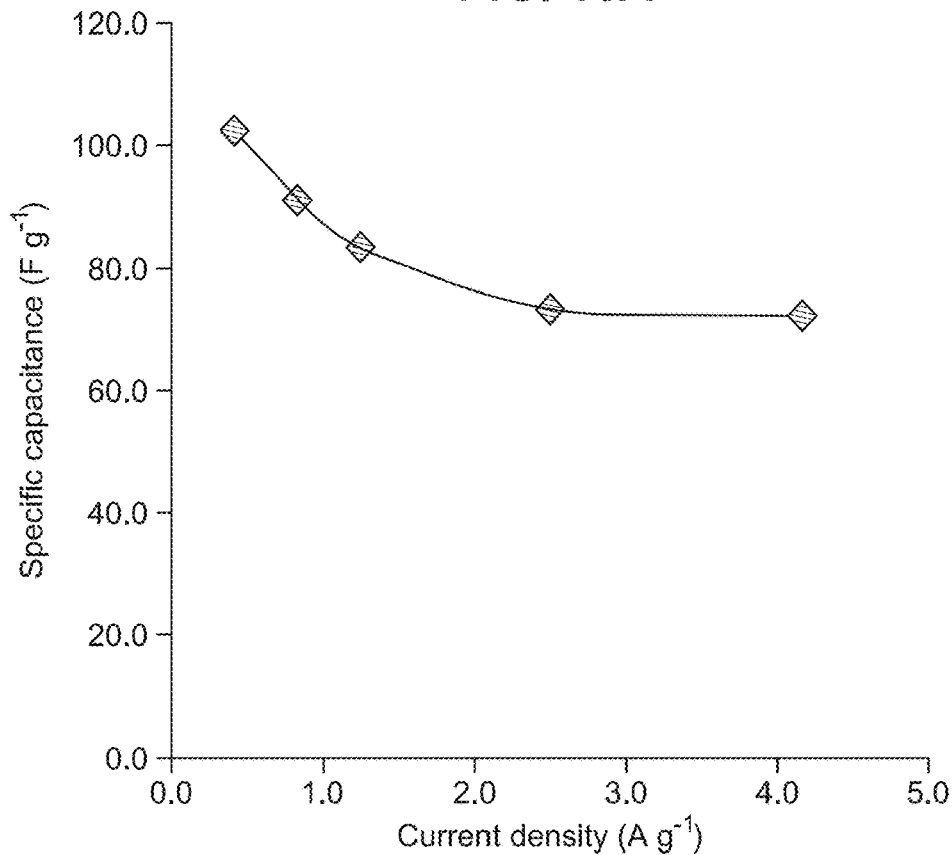
FIG. 10B depicts an effect of current density on capacitance of the supercapacitive solar cell, according to certain embodiments.

FIG. 10A shows the GCD measurement of the device 300 in a potential window of 0 V to 1.5 V at different current densities ranging from 0.4 A/g to 4.2 A/g, particularly, 0.4 A g$^{-1}$ (1002), 0.8 A g$^{-1}$ (1004), c) 1.3 A g$^{-1}$ (1006), 2.5 A g$^{-1}$ (1008), and e) 4.2 A g$^{-1}$ (1010). The dependence of the specific capacitance (Cs) on the current density value has been explained by plotting a graph between specific capacitance and current density, as shown in FIG. 10B. The specific capacitance decreased only slightly by increasing the current density indicating that the device 300 works efficiently even at higher current densities.

Self-Charging Under Visible Light

Figure 11A:
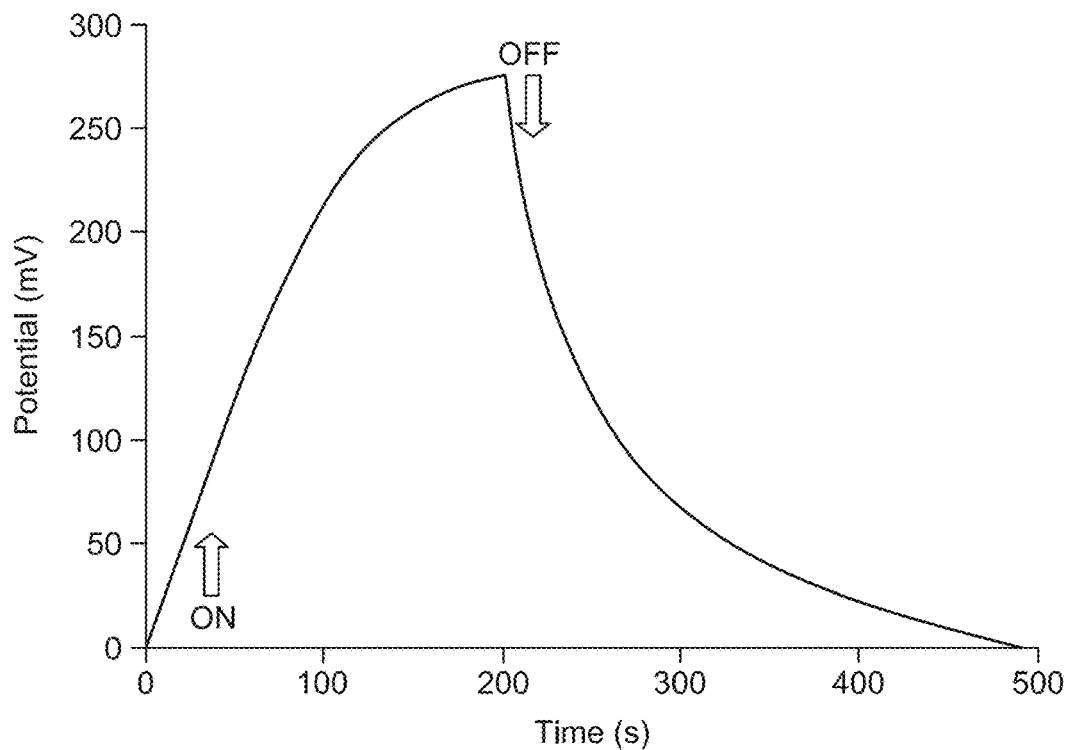
FIG. 11A depicts self-charging ability of the supercapacitive solar cell under visible light without any external bias using 150-watt xenon lamp equivalent to 1 sun, according to certain embodiments.
Figure 11B:
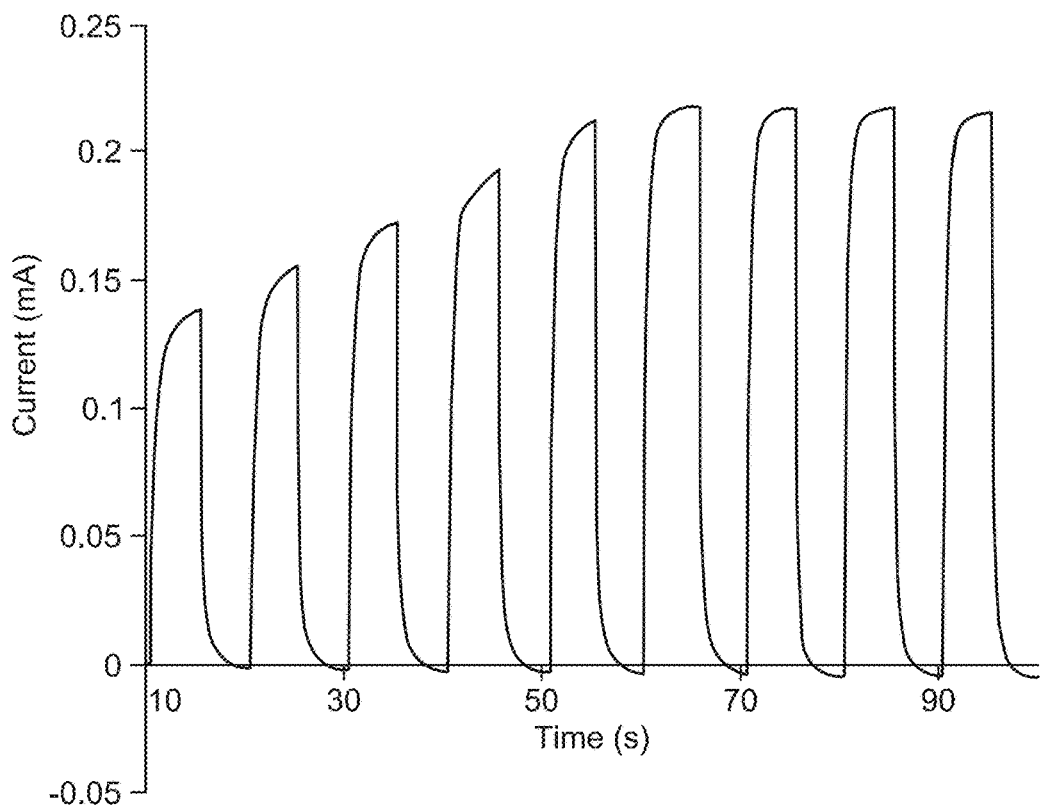
FIG. 11B depicts a photo generated current for successive ON and OFF cycles, according to certain embodiments.

The device 300 was tested under visible light regarding self-charging ability using 150-watt xenon lamp, which is comparable to sunlight. The device 300 demonstrated excellent charging and discharging response under visible light as shown in the FIG. 11A. The device 300 was charged to −270 mV by shining light on it, and then the device 300 was allowed to discharge by turning off the light. The photo generated current under successive ON and OFF cycles of light is depicted in the FIG. 11B. The photo generated current went on increasing with time and reached to a saturation value of 0.22 mA, comparable to the current produced under sunlight.

Self-Charging Under UV

Figure 12A:
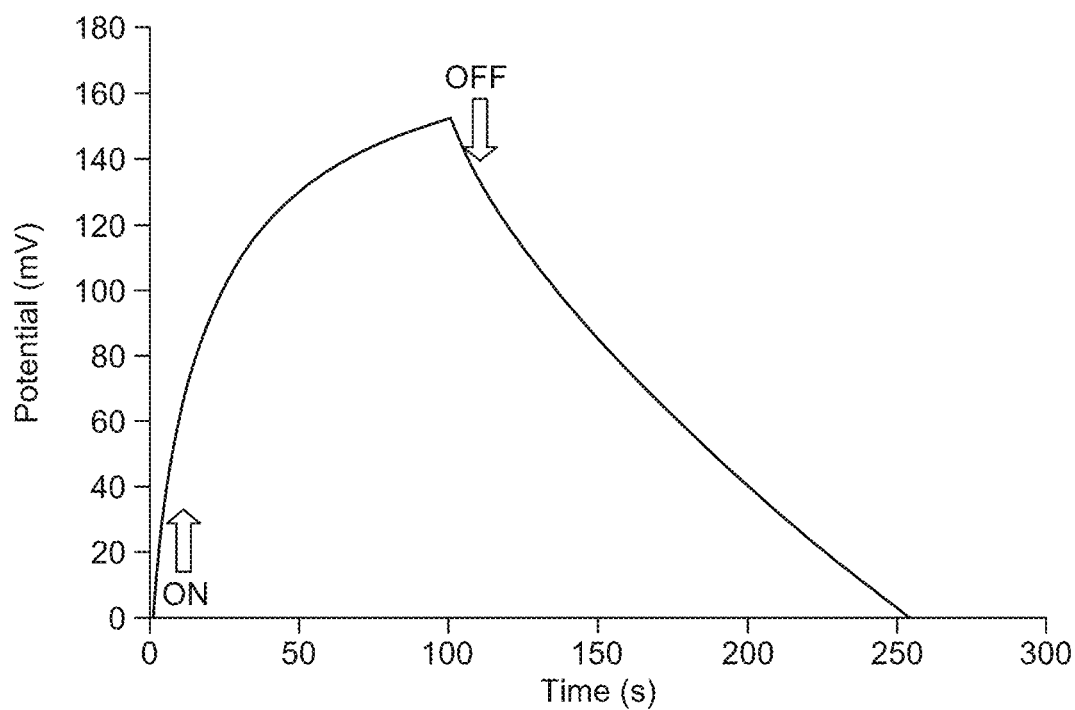
FIG. 12A depicts self-charging of the light harvesting supercapacitor under UV without any external bias, according to certain embodiments.
Figure 12B:
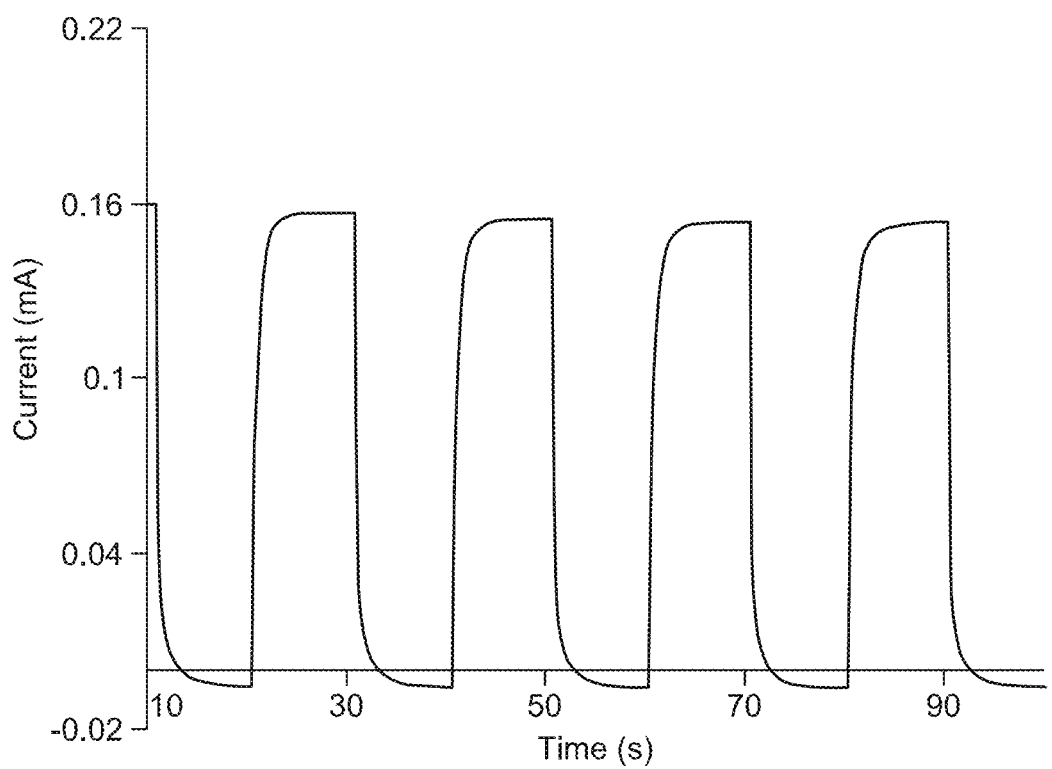
FIG. 12B depicts charging and discharging behavior of the light harvesting supercapacitor under UV generated current under successive ON and OFF of UV, according to certain embodiments.

The device 300 was tested under UV regarding self-charging and photo generated current as shown in the FIG. 12A and FIG. 12B. The device 300 charges itself up to −150 mV just by shining UV on it without any external bias. The discharging time was found to be even higher than charging time, that is more or less a battery like behavior, demonstrating a longer working time of the device 300, once it is charged, as shown in the FIG. 12A. The UV generated current under successive ON and OFF cycles of UV is depicted in the FIG. 12B. The device 300 reached a maximum current at ~0.16 mA as soon as the UV was shined on it, and it remained constant for the rest of the cycles.

Iodide/Tri-Iodide Electrolyte-Based Device with the Same Architecture

Figure 14:
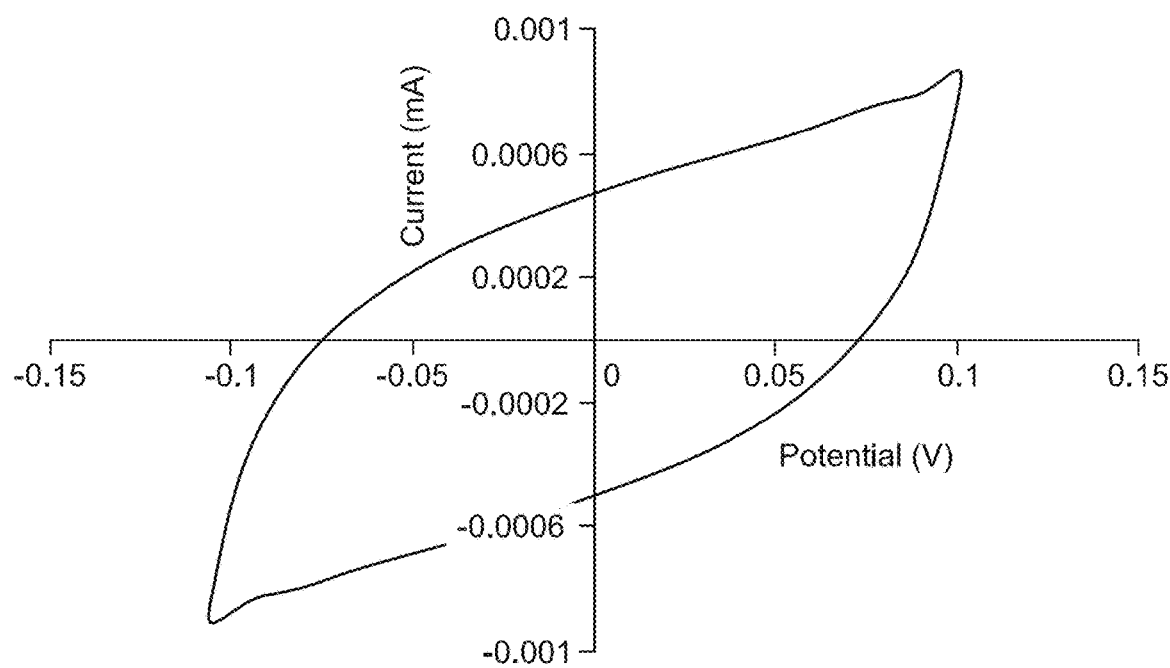
FIG. 14 depicts a CV curve for the supercapacitive solar cell using iodide/triiodide electrolyte at a scan rate of 0.1 mV/s, according to certain embodiments.
Figure 15:
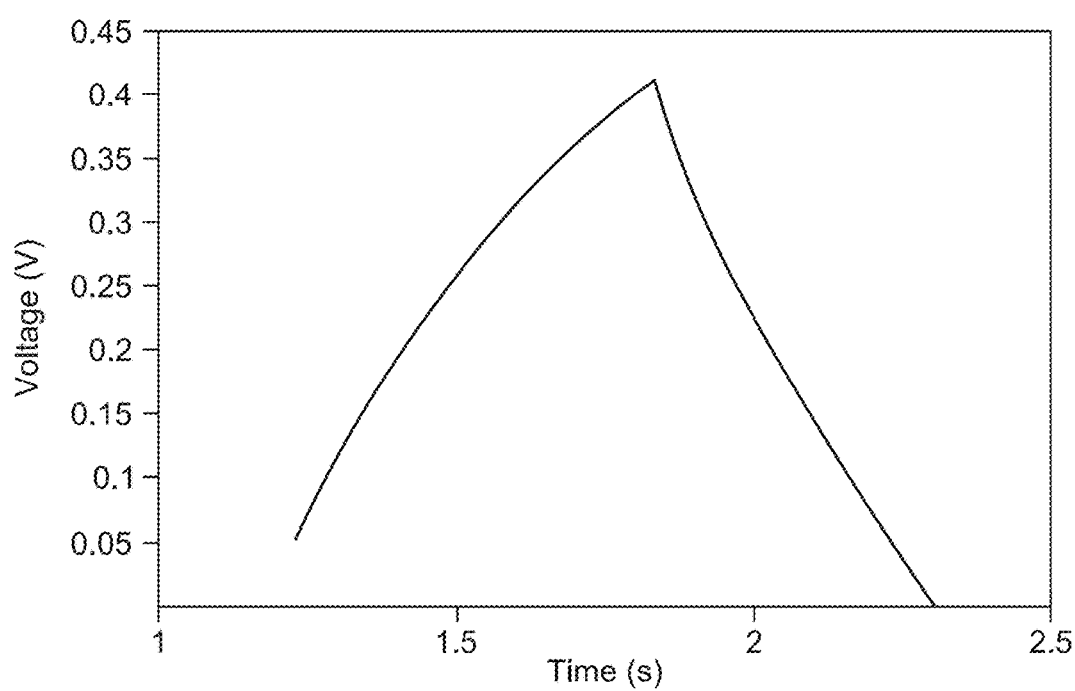
FIG. 15 depicts the GCD curve for the supercapacitive solar cell using the iodide/tri-iodide electrolyte in a potential window of 0.4 V, according to certain embodiments.

Another device having iodide/tri-iodide as a electrolyte (a light harvesting material) was fabricated. Since both the photo anode and the electrolyte contribute to the light harvesting ability of the device, it was believed that this device would enhance the light harvesting ability. The photo generated current of this device under UV (1304) and visible light (1302) was shown in the FIG. 13A. The UV generated current (1304) was found to be very high (i.e., 1.1 mA), whereas the visible light generated current (1302) was around 0.2 mA. No response was observed under dark the conditions (1306), as can be observed from the FIG. 13B, confirming the light responsive behavior of the device 300. The CV curve for this device is obtained in a potential window of 0.2 V and 0.1 mV/s scan rate as shown in the FIG. 14. The charging and discharging measurement of the device 300 was obtained using Metrohm auto lab in a potential window of 0.4 V, as shown in the FIG. 15. The charging and discharging were very fast demonstrating the true capacitive nature of the device.

The invention claimed is:

1. A light harvesting supercapacitor, comprising:
    a transparent conducting substrate;
    an active layer comprising TiO$_2$ nanoparticles and polyaniline nanoparticles disposed on the transparent conducting substrate;
    an electrolyte layer comprising a solid separator and an electrolyte comprising polyvinyl alcohol and at least one ionic material selected from the group consisting of phosphoric acid, sulfuric acid, hydrochloric acid, hydrobromic acid, hydroiodic acid, an alkali metal phosphate salt, an alkali metal sulfate salt, an alkali metal hydroxide, an alkali metal halide, and a mixture of a halogen and alkali metal halide disposed on the active layer;
    a carbon electrode disposed on the electrolyte layer; and
    a metal layer disposed on the activated carbon electrode.

2. The light harvesting supercapacitor of claim 1, wherein the transparent conducting substrate is fluorine-doped tin oxide (FTO) coated glass.

3. The light harvesting supercapacitor of claim 1, wherein the transparent conducting substrate is polyethylene terephthalate.

4. The light harvesting supercapacitor of claim 1, wherein the active layer comprises a TiO$_2$ sublayer comprising the TiO$_2$ nanoparticles and a polyaniline sublayer comprising the polyaniline nanoparticles.

5. The light harvesting supercapacitor of claim 4, wherein the TiO$_2$ sub-layer is disposed on the transparent conducting substrate and the polyaniline sub-layer is disposed on the TiO$_2$ sublayer such that the polyaniline sub-layer does not contact the transparent conducting substrate.

6. The light harvesting supercapacitor of claim 1, wherein the TiO$_2$ nanoparticles are crystalline by PXRD, adopt the anatase crystal structure, and have a mean particle size of 1 to 100 nm.

7. The light harvesting supercapacitor of claim 1, wherein the polyaniline nanoparticles have a mean particle size of 10 to 200 nm.

8. The light harvesting supercapacitor of claim 1, wherein the electrolyte layer comprises a paper separator, polyvinyl alcohol, and phosphoric acid.

9. The light harvesting supercapacitor of claim 1, wherein the carbon electrode comprises activated carbon, conductive carbon, and PVDF.

10. The light harvesting supercapacitor of claim 1, wherein the metal layer is an aluminum layer.

11. The light harvesting supercapacitor of claim 1, having a specific capacitance of 75 to 125 F/g at a current density of 0.3 to 0.5 A/g.

12. The light harvesting supercapacitor of claim 1, having an energy density of 17.5 to 27.5 Wh/kg and a power density of 11,000 to 14,000 W/kg.

13. The light harvesting supercapacitor of claim 1, having a bandgap of 2.5 to 2.95 eV.

14. A method of preparing the light harvesting supercapacitor of claim 1, the method comprising:
    coating the transparent conducting substrate with a paste comprising the TiO$_2$ nanoparticles to form a coated substrate;
    heating the coated substrate to form an intermediate structure;

immersing the first intermediate structure in a dispersion comprising the polyaniline nanoparticles and a solvent to form a first device portion;

disposing the carbon electrode on a metal substrate to form a second device portion;

sandwiching the electrolyte layer between the active layer of the first device portion and the carbon electrode of the second device portion to form the light harvesting supercapacitor.

15. The method of claim 14, further comprising forming the polyaniline nanoparticles by exposing a suspension of polyaniline in a nanoparticle synthesis solvent to a pulsed laser having a wavelength of 525 to 550 nm and a pulse energy of 275 to 425 mJ/pulse.

16. The method of claim 15, wherein the nanoparticle synthesis solvent is an alcohol having 1 to 4 carbon atoms and the polyaniline is present in the suspension in an amount of 1 to 4 mg/mL of suspension.

17. The method of claim 14, wherein the immersing is performed for 12 to 48 hours.

18. The method of claim 14, wherein the coating is performed by doctor blade-coating.

19. The method of claim 14, wherein the transparent conducting substrate is fluorine-doped indium tin oxide (FTO) coated glass and the heating is performed at 400 to 600° C.

20. A photovoltaic device comprising the light harvesting supercapacitor of claim 1.

* * * * *